United States Patent [19]
Jäckel et al.

[11] Patent Number: 5,908,095
[45] Date of Patent: Jun. 1, 1999

[54] APPARATUS FOR DAMPING TORSIONAL VIBRATIONS

[75] Inventors: Johann Jäckel, Baden-Baden; Andreas Raimann, Rheinmünster; Hartmut Mende, Sinzheim, all of Germany

[73] Assignee: Luk Lamellen und Kupplungsbau GmbH, Buhl, Germany

[21] Appl. No.: 08/858,875

[22] Filed: May 19, 1997

[30] Foreign Application Priority Data

May 28, 1996 [DE] Germany .......................... 196 21 314

[51] Int. Cl.$^6$ ................. F16D 3/14; F16D 47/02
[52] U.S. Cl. .................... 192/70.17; 192/55.51; 192/207; 192/212; 464/57; 464/68; 74/574
[58] Field of Search ............... 192/55.3, 55.5, 192/55.51, 55.61, 70.17, 201, 207, 212, 41 S, 81 C, 56.2; 464/57, 58, 59, 60, 40, 68; 74/574

[56] References Cited

U.S. PATENT DOCUMENTS

| | | |
|---|---|---|
| 1,541,748 | 6/1925 | Davis . |
| 1,935,683 | 11/1933 | Wemp ..................................... 192/55.5 |
| 1,957,114 | 5/1934 | Spase .................................. 192/212 X |
| 1,991,436 | 2/1935 | Wemp ...................................... 192/212 |
| 1,997,021 | 4/1935 | Spase . |
| 2,061,827 | 11/1936 | Brooks .............................. 192/55.51 X |
| 4,181,208 | 1/1980 | Davis ...................................... 192/207 |
| 4,727,970 | 3/1988 | Reik et al. . |
| 4,782,936 | 11/1988 | Bopp ................................ 192/55.51 X |
| 5,307,913 | 5/1994 | Szadkowski .......................... 192/70.17 |
| 5,680,918 | 10/1997 | Reik et al. .............................. 192/55.1 |

FOREIGN PATENT DOCUMENTS 196 31 725 A 1   3/1997   Germany .

Primary Examiner—Richard M. Lorence
Attorney, Agent, or Firm—Darby & Darby

[57] ABSTRACT

An apparatus for damping torsional vibrations, particularly between coaxial primary and secondary masses of a composite flywheel in the power train between the engine and the transmission of a motor vehicle, has at least one coil spring or torsion spring which extends around the common axis of the two masses, which is stressed at least in the radial direction, and which is in a mere frictional (rather than positive) torque transmitting engagement with at least one of the masses. The spring can be installed to transmit torque from the secondary mass to the primary mass and/or vice versa, and such spring can operate in series with a damper between the primary and secondary masses.

38 Claims, 10 Drawing Sheets

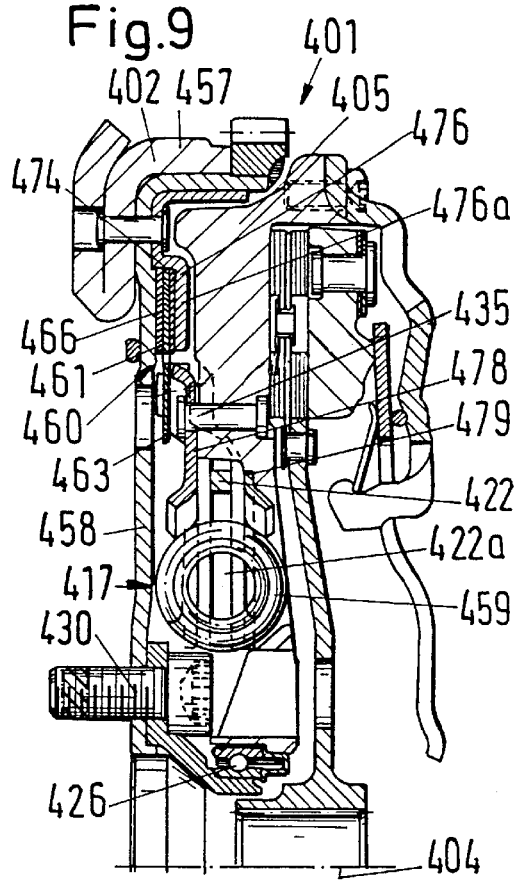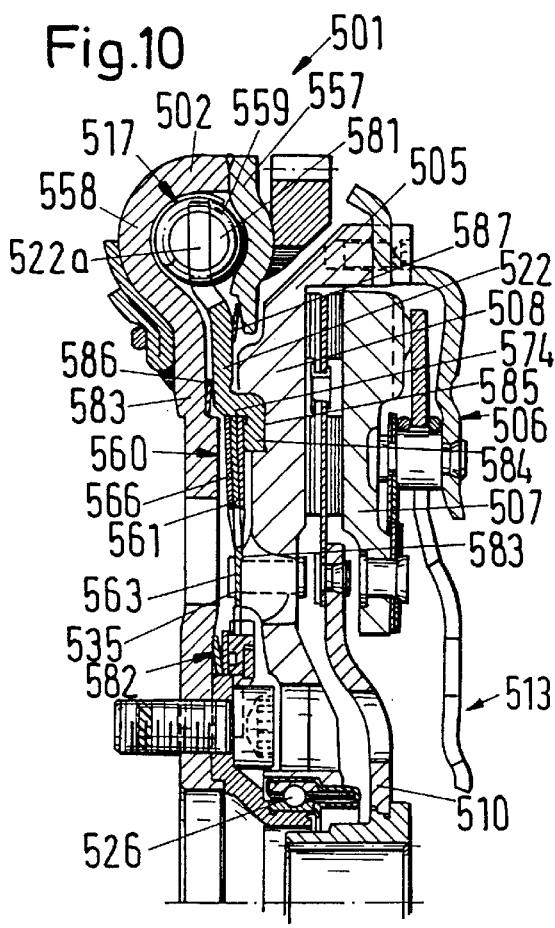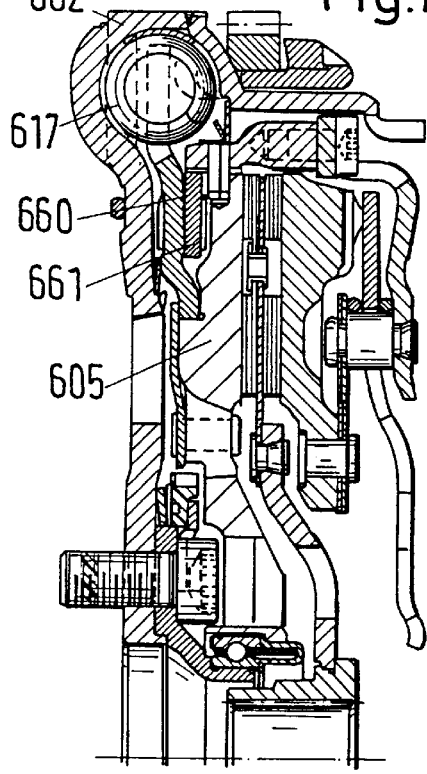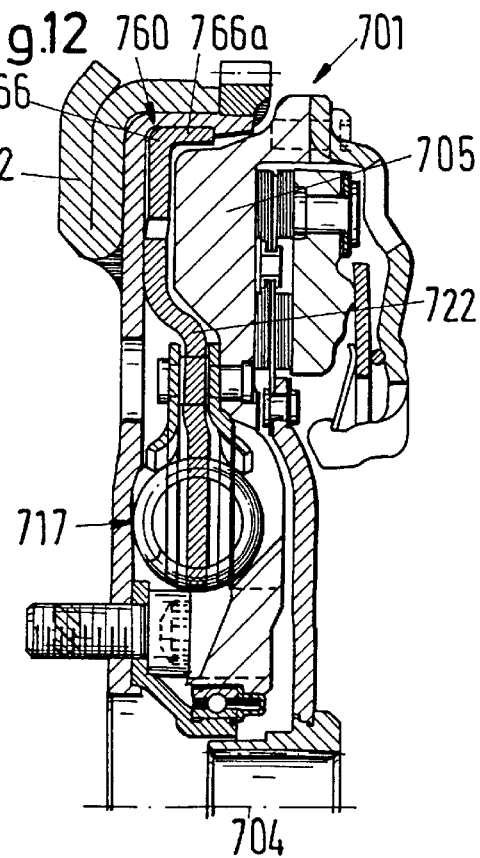

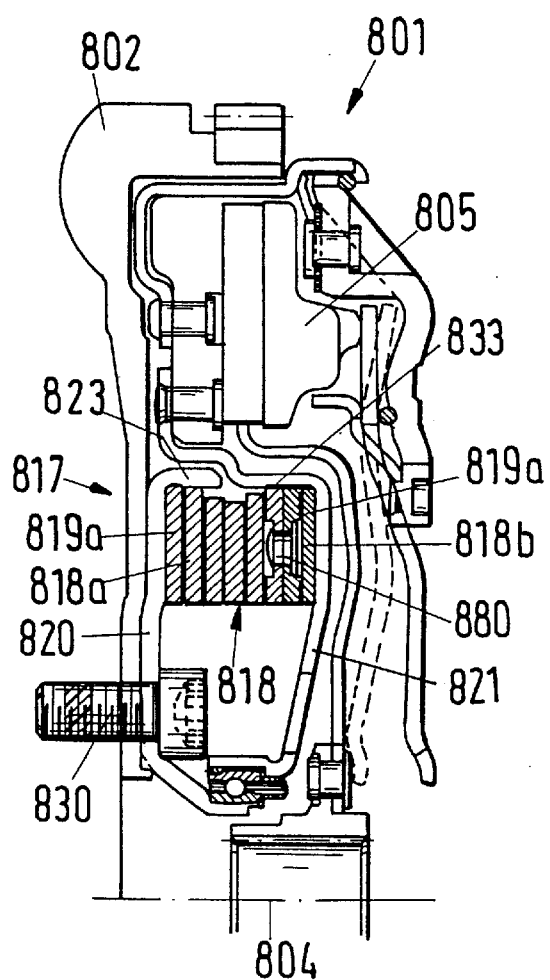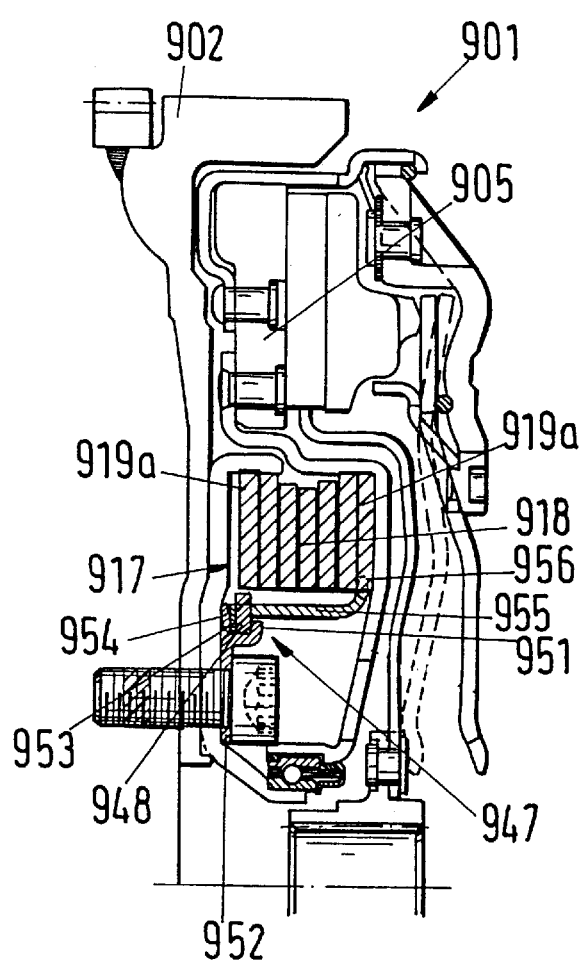

APPARATUS FOR DAMPING TORSIONAL VIBRATIONS

BACKGROUND OF THE INVENTION

The present invention relates to apparatus for damping torsional vibrations. Such apparatus can be utilized with advantage in composite masses or flywheels which are installed in the power trains of motor vehicles to transmit torque between a prime mover (e.g., a combustion engine) and a driven unit (e.g., a manually shiftable, automated or automatic transmission). More particularly, the invention relates to improvements in apparatus wherein torque is being transmitted between an output member (such as a member including a primary mass or flywheel of a composite mass or flywheel) and an input member (such as a member including a secondary mass or flywheel of the composite mass or flywheel) by way of one or more resilient elements which permit angular movements of the output and input members relative to each other.

U.S. Pat. Nos. 1,541,748 (granted Jun. 9, 1925 to Davis) and 1,997,021 (granted Apr. 9, 1935 to Spase) disclose cushioning or vibration damping apparatus wherein one or more springs extend around the common axis of the rotary input and output members. One end portion of each spring is form-lockingly connected with the input member, and the other end portion of each such spring is form-lockingly connected with the output member. A drawback of such apparatus is that they prevent rotation of the input and output members relative to each other beyond a predetermined angle regardless of the magnitude of transmitted torque and irrespective of the circumstances of use of the patented apparatus.

OBJECTS OF THE INVENTION

An object of the invention is to provide a torsional vibrations damping apparatus which, if necessary or desirable or advantageous, permits unlimited angular displacements of the input and output members relative to each other.

Another object of the invention is to provide an apparatus which constitutes an improvement over and a further development of apparatus disclosed in the aforementioned U.S. Pat. Nos. 1,541,748 and 1,997,021.

A further object of the invention is to provide an apparatus whose vibration damping action and whose stability are superior to those of presently known vibration damping apparatus.

An additional object of the invention is to provide a simple and compact apparatus which can be produced, assembled and installed at a reasonable cost.

Still another object of the invention is to provide novel and improved torque transmitting means for use in the above outlined apparatus.

A further object of the invention is to provide a power train, particularly a power train between the engine and the transmission of a motor vehicle, which embodies one or more novel torsional vibrations damping apparatus.

Another object of the invention is to provide a vibrations damping apparatus which can perform one or more desirable, important and advantageous functions in the power train of a motor vehicle irrespective of whether the engine is pulling a load or the vehicle is coasting.

An additional object of the invention is to provide a novel and improved torque transmitting connection between the primary and secondary masses or flywheels of a composite mass or flywheel in the power train of a motor vehicle.

Still another object of the invention is to provide a novel and improved method of transmitting torque in the power train between a prime mover and a driven unit, such as between a combustion engine and a transmission, in a motor vehicle.

SUMMARY OF THE INVENTION

The invention resides in the provision of an apparatus for damping torsional vibrations. The apparatus comprises an input member which is connectable with a rotary part of a prime mover (such as the camshaft or crankshaft of the combustion engine in a motor vehicle) and is rotatable about a predetermined axis, an output member which is coaxial with and is rotatable relative to the input member and is connectable with a rotary part of a driven unit (such as the input shaft of a transmission in the power train of a motor vehicle), and means for transmitting torque between and for opposing rotation of the input and output members relative to each other. The torque transmitting means comprises at least one elongated resilient element (such as a leg) which extends around the common axis of the input and output members and is bendable at least radially of such axis. The at least one resilient element is normally stressed radially of the common axis to thus establish a frictional engagement between the torque transmitting means and at least one of the input and output members, i.e., no positive (such as form-locking) connection exists between the at least one resilient element and at least one of the input and output members.

The improved apparatus can further comprise means for form-lockingly connecting the at least one resilient element with the other of the input and output members. Alternatively, the at least one resilient element can comprise a first portion which is in frictional engagement with the input member and a second portion which is in frictional engagement with the output member.

At least a portion of the at least one resilient element can constitute a spiral. For example, the at least one resilient element can include or constitute a coil spring which is at least substantially coaxial with the input and output members. Alternatively, the at least one resilient element can include or constitute a torsion spring.

The torque transmitting means can comprise a plurality of resilient elements (e.g., two or three discrete resilient elements) which are offset relative to each other in a circumferential direction of the input and output members so that the resilient elements counterbalance each other when the input and output members rotate about their common axis.

The torque transmitting means can further comprise an annular main or primary portion and the at least one resilient element then extends from such primary portion around the common axis of the input and output members.

In accordance with a presently preferred embodiment, the at least one resilient element extends around the common axis of the input and output members along an arc of at least 90°, particularly along an arc of between about 180° and 540°. For example, the at least one resilient element can extend along an arc or between about 400° and 500°, particularly about 450°.

The at least one of the input and output members can be provided with a rotary surface which is in frictional engagement with the at least one resilient element; such surface can constitute or can form part of an at least sub-stationary cylindrical surface.

The input and output members and the torque transmitting means of the improved torsional vibrations damping apparatus can form part of a composite mass or flywheel. Thus, the input member can comprise a first flywheel which is connectable with the rotary part of the prime mover, and the output member can comprise a second flywheel which is connectable with the rotary part of the driven unit, particularly by way of a friction clutch. The driven unit can include the transmission in the power train of a motor vehicle.

A bearing, such as an antifriction bearing with one or more annuli of rolling elements between two races, can be interposed between the input and output members.

The torque transmitting means of the improved apparatus can be designed in such a way that it transmits torque at least from the input member to the output member and that the frictional engagement between the at least one resilient element and the at least one of the input and output members increases as a result of rotation of the output member in response to rotation of the input member by the prime mover but that such frictional engagement at least decreases (or goes down to zero) as a result of rotation of the output member by at least one device other than the prime mover. If the prime mover is the engine of a motor vehicle, the at least one device can include the driven unit which rotates the output member when the vehicle is coasting.

The at least one resilient element can form part of a freewheel which at least reduces (or interrupts or prevents) the transmission of torque from the output member to the input member by way of the at least one resilient element when the vehicle is coasting.

The at least one resilient element can engage a surface which extends at least substantially radially of the common axis of the input and output members when the engine of a motor vehicle drives the input member so that the latter transmits torque to the output member and the torque being transmitted by the at least one resilient element rises to a predetermined value.

The improved apparatus can further comprise a resiliently yieldable damper which is installed to operate between the input and output members in series with the torque transmitting means. The damper can comprise at least one coil spring which extends (a) substantially circumferentially of the input and output members or (b) substantially tangentially of an annular portion of at least one of the input and output members. The at least one resilient element can be installed ahead (upstream) of the damper as seen in the direction of transmission of torque from the prime mover to the driven unit. The damper can be arranged to damp torsional vibrations between the input and output members at least when the prime mover transmits torque to the driven unit by way of the torque transmitting means.

If the prime mover includes or constitutes the engine (such as a combustion engine) of a motor vehicle, the at least one resilient element can be designed and installed to permit the output member to rotate relative to the input member at least when the vehicle is coasting and the magnitude of the torque being transmitted by the output member to the input member by way of the last one resilient element reaches a predetermined value.

At least one of the input and output members can comprise a substantially sleeve-like or mandrel-shaped guide for the at least one resilient element.

The at least one resilient element is or can be constructed and installed between the input and output members to yieldably oppose but to permit a predetermined angular displacement of the input and output members relative to each other.

If the prime mover is or includes the engine of a motor vehicle, the at least one resilient element can be designed and installed to transmit from the output member to the input member a torque in the range of between about 50 and 200 Nm (particularly between about 80 and 150 Nm) when the vehicle is coasting.

The novel features which are considered as characteristic of the invention are set forth in particular in the appended claims. The improved torsional vibrations damping apparatus itself, however, both as to its construction and the mode of assembling, installing and utilizing the same, together with numerous additional important and advantageous features thereof, will be best understood upon perusal of the following detailed description of certain presently preferred specific embodiments with reference to the accompanying drawings.

BRIEF DESCRIPTION OF THE DRAWINGS

FIG. 9 is a fragmentary axial sectional view of another apparatus;

FIG. 10 is a similar fragmentary axial sectional view of a further apparatus;

FIG. 11 is a similar fragmentary axial sectional view of an additional apparatus;

FIG. 12 is a similar fragmentary axial sectional view of a further apparatus;

FIG. 14 is a fragmentary axial sectional view of an additional torsional vibrations damping apparatus;

FIG. 15 is a similar fragmentary axial sectional view of a further apparatus;

DESCRIPTION OF PREFERRED EMBODIMENTS

Figure 1:
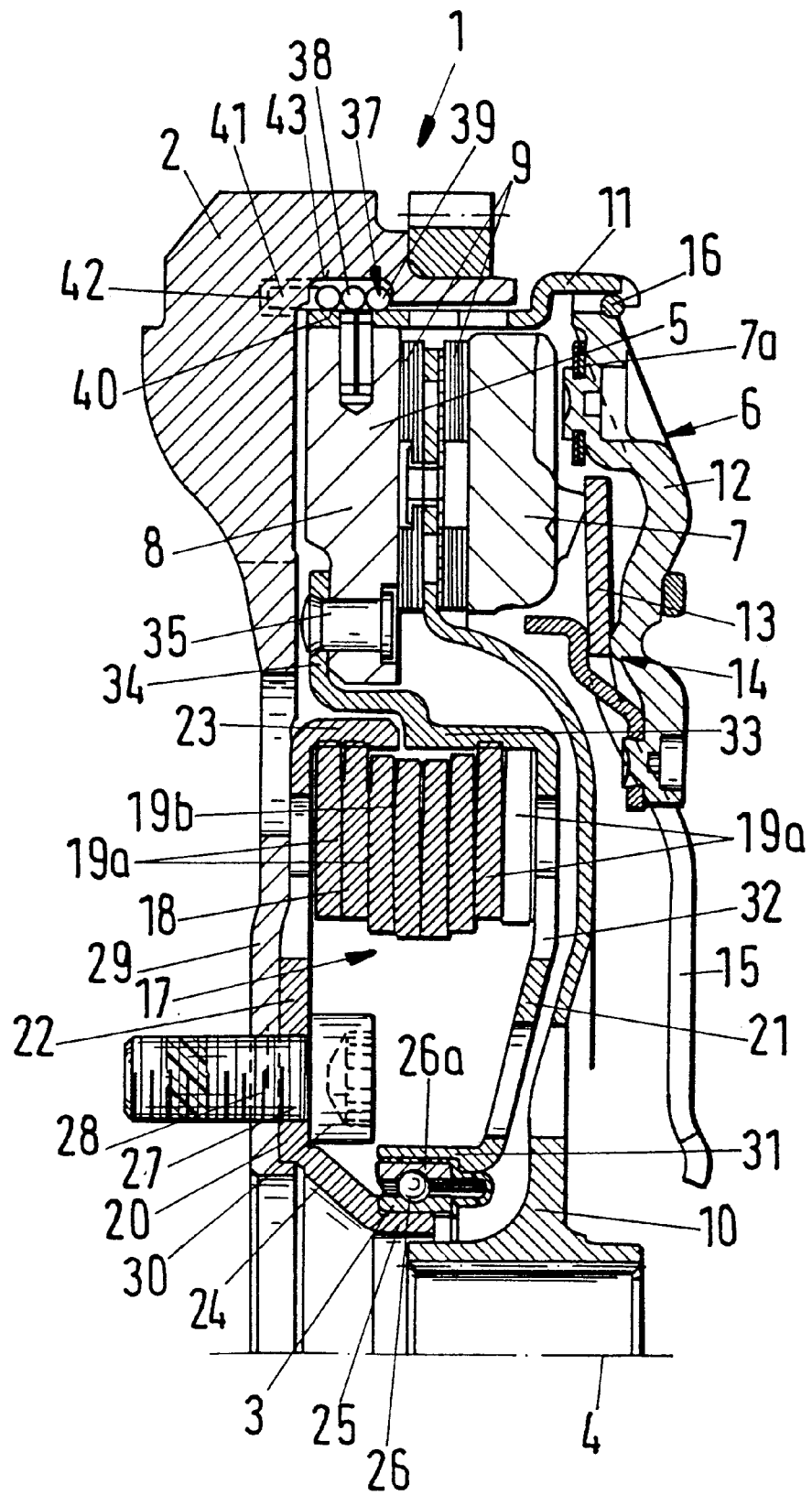
FIG. 1 is a fragmentary axial sectional view of a torsional vibrations damping apparatus which constitutes a composite flywheel and embodies one form of the present invention.

FIG. 1 shows a portion of an apparatus 1 which can be utilized in a power train between a rotary part of a prime mover (such as the camshaft or the crankshaft of a combustion engine in a motor vehicle) and a rotary part of a driven unit (such as the input shaft of a manual, automated or automatic transmission which can drive the differential for the wheels of the motor vehicle). Reference may be had, for example, to commonly owned U.S. Pat. No. 4,727,970 granted Mar. 1, 1988 to Wolfgang Reik et al. for "TORQUE TRANSMITTING AND TORSION DAMPING APPARATUS FOR USE IN MOTOR VEHICLES"; this patent shows the output shaft of a combustion engine and the input shaft of a transmission, and its disclosure is incorporated herein by reference.

The apparatus 1 of FIG. 1 is a composite mass or flywheel which includes a primary mass or flywheel 2 connectable to the rotary part of the prime mover by a set of bolts 30 or other suitable fasteners, and a secondary mass or flywheel 5 which can drive the rotary part of the driven unit by way of a friction clutch 6. The flywheels 2 and 5 are rotatable with and relative to each other about a common axis 4 and are centered relative to each other by a suitable bearing 3, e.g., an antifriction bearing having at least one annulus of spherical or otherwise configurated rolling elements between an inner race 26 and an outer race 26a.

The friction clutch 6 comprises an axially movable rotary pressure plate 7 which, when the clutch is engaged, cooperates with a rotary counterpressure plate 8 to clamp the friction linings 9 of a clutch plate or clutch disc 10. The latter has an internally splined hub which serves to transmit torque to, or to receive torque from, the input shaft of the transmission, depending upon whether the motor vehicle is in the process of pulling a load (the flywheel 2 then transmits torque to the flywheel 5) or the vehicle is coasting (at such time, the flywheel 5 transmits or tends to transmit torque to the flywheel 2).

The counterpressure plate 8 is a constituent of or is rigidly connected to the primary flywheel 2, and its radially outer portion or part is of one piece with or is non-rotatably connected to an annular portion or section 11 which is secured to the housing or cover 12 of the friction clutch 6. A clutch spring 13 (here shown as a diaphragm spring) of the friction clutch 6 reacts against the housing 12 and bears against the pressure plate 7 to bias the latter against the adjacent set of friction linings 9 when the clutch is engaged. At such time, the other set of friction linings 9 bears against the counterpressure plate 8 so that the clutch disc 10 is compelled to share the angular movements of the plates 7, 8 (or vice versa, depending upon whether the vehicle is pulling a load or coasting). The pressure plate 7 rotates with the housing 12 and with the counterpressure plate 8 but has a limited freedom of axial movement in the direction of the axis 4.

The friction clutch 6 further comprises an annular seat 14 which tiltably mounts the diaphragm spring 13 on the housing 12 so that the diaphragm spring acts as a two-armed lever. The circumferentially complete radially outer or main portion of the diaphragm spring 13 is arranged to bear against the pressure plate 7, and the radially inner portion of the diaphragm spring includes or is constituted by a set of substantially radially inwardly extending tongues or prongs 15 which constitute or form part of or cooperate with the means for actuating (engaging and disengaging) the friction clutch 6. The illustrated friction clutch is a so-called push-type clutch because it is engaged when the prongs 15 of the diaphragm spring 13 are permitted to assume the illustrated positions, i.e., when the diaphragm spring is free to bias the friction surface of the pressure plate 7 against the adjacent set of friction linings 9. When the radially innermost portions or tips of the prongs 15 are depressed in the direction of the axis 4 and toward the primary flywheel 2 (e.g., by a clutch disengaging bearing, not shown), the clutch 6 is disengaged because the diaphragm spring 13 is tilted relative to the seat 14 and its radially outer portion moves away from the counterpressure plate 8; this enables the customary leaf springs 7a to pull the pressure plate 7 axially and away from the counterpressure plate 8 so that the clutch disc 10 is released and can rotate relative to the flywheels 2, 5 and/or vice versa. The leaf springs 7a operate between the housing 12 and the pressure plate 7 and tend to pull the pressure plate in a direction to the right, as viewed in FIG. 1 (reference may be had again to the commonly owned U.S. Pat. No. 4,727, 970).

The housing 12 of the friction clutch 6 is coupled to the annular section 11 by one or more fasteners 16, e.g., by a single fastener 16 which constitutes or resembles a wire ring. Reference may be had, for example, to published German patent application No. 44 20 354. The annular section 11 is or can be made of a suitable metallic sheet material.

The improved torsional vibrations damping apparatus 1 comprises a rotary input member (which, in FIG. 1, includes the primary flywheel 2), a rotary output member (which, in FIG. 1, includes the secondary flywheel 5), and a torque transmitting device or unit 17 which serves to yieldably oppose rotation of the input and output members relative to each other and includes an elongated resilient element 18. This resilient element can be called a coil spring having an axis which coincides with the common axis 4 of the input and output members of the apparatus (composite flywheel) 1 or a torsion spring because its convolutions 19 are (or can be) stressed radially and circumferentially when the primary and secondary flywheels 2, 5 actually turn relative to each other about the axis 4. The convolutions or windings 19 of the resilient element 18 (hereinafter called spring for short) spacedly surround the axis 4 and are normally stressed substantially radially of such axis. These convolutions are deformable or bendable radially as well as in the direction of the axis 4. The spring 18 is installed in such a way that its end convolutions 19a tend to turn relative to each other when the spring is called upon to transmit torque from the primary flywheel 2 to the secondary flywheel 5 or in the opposite direction whereby it stores energy or stores additional energy or dissipates energy. In each such event, the convolutions 19 are stressed longitudinally, namely they are being bent or they tend to bend in a circumferential direction of the flywheels 2 and 5, i.e., around the axis 4.

The illustrated spring is or can be obtained as a result of winding of a wire having a polygonal (rectangular) cross-sectional outline, i.e., a flat cross-sectional outline as contrasted with the customary round wire. However, it is also possible to obtain the illustrated spring 18 from a suitable hollow cylindrical blank having a thickness corresponding to the radial dimension of the cross-section of a convolution 19. For example, the hollow cylindrical blank can be provided with a helically extending slit which separates the neighboring convolutions 19 of the thus obtained spring 18 from each other. The conversion of a hollow cylindrical blank into the spring 18 can take place in a machine wherein the blank is rotated about its axis and is being acted upon by a suitable severing tool which is caused to move axially of the rotating blank. Alternatively, the cylindrical blank can rotate about its own axis and simultaneously advance axially relative to a stationary severing or slitting tool. The machine for the conversion of hollow cylindrical blanks into springs 18 can constitute or resemble a standard or modified spiral cutting or shaving machine tool.

Figure 6:
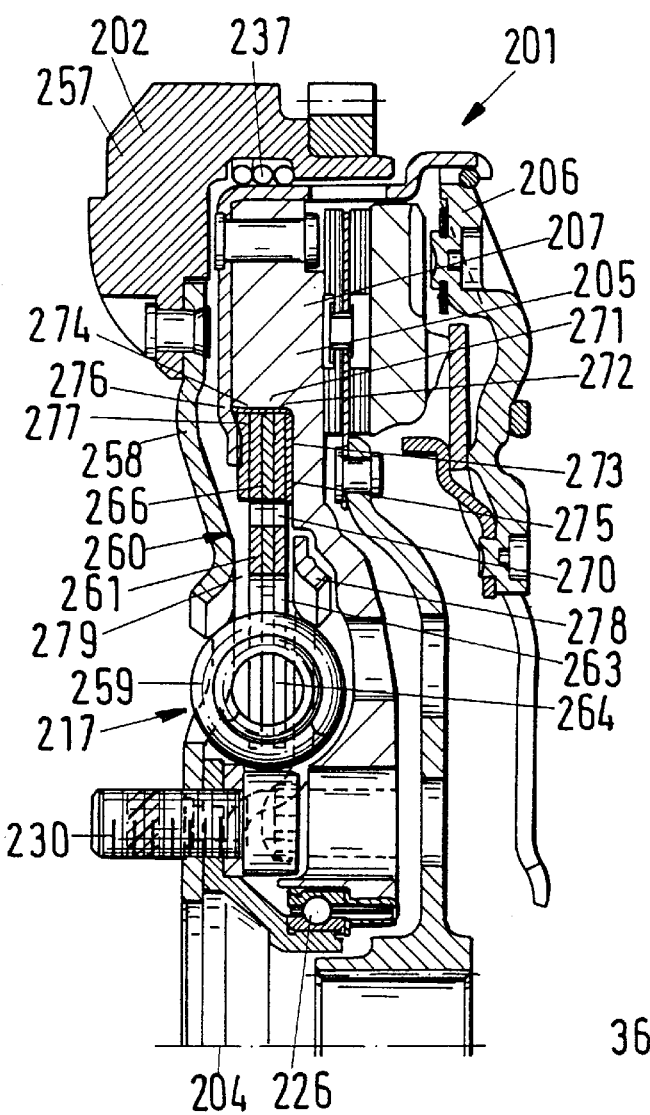
FIG. 6 is a similar fragmentary axial sectional view of another apparatus.

The primary flywheel 2 is an extrusion, a casting or a forging. However, it is also possible to employ a primary flywheel which is made of sheet metal, e.g., in a manner as shown in FIG. 9 (namely by folding several layers of metallic sheet material next to and/or over each other in order to obtain a flywheel having a required mass). Still further, it is possible to employ a composite flywheel which includes one or more cast, extruded and/or forged parts and one or more sheet metal parts. Reference may be had to FIG. 6 which shows a composite primary flywheel 202 having a radially outer portion or section 257 which is a casting or extrusion or forging, and a thin-walled radially inner portion or section 258 of metallic sheet material. Alternatively, the radially outer portion or section 257 can be replaced with a multi-layer sheet metal section or portion of the type shown (at 457) in FIG. 9. If the primary flywheel comprises two or more separately produced portions or sections or parts, such portions, sections or parts can be non-rotatably secured to each other by one or more welded seams or spots, by rivets and/or in any other suitable manner.

The input member of the composite flywheel 1 comprises the aforementioned primary flywheel 2 as well as a component 20 which can be made of sheet metal and shares all angular movements of the flywheel 2. At least one left-hand end convolution 19a (as seen in FIG. 1) of the spring 18 is in frictional engagement with the component 20, and more particularly with a radially extending washer-like portion 22 and/or with an axially extending tubular (particularly cylindrical) portion 23 of the component 20.

The output member of the apparatus or composite flywheel 1 comprises the secondary flywheel 5 as well as a component 21 which is or which can be made of a metallic sheet material and shares all angular movements of the flywheel 5. The right-hand end convolution or convolutions 19a (again as seen in FIG. 1) of the spring 18 are normally in frictional engagement with a substantially radially extending disc- or washer-like portion 32 and/or with a tubular (such as cylindrical) radially outer portion 33 of the component 21.

It will be seen that the transmission of torque between the primary and secondary flywheels 2, 5 by way of the spring 18 actually takes place between the sheet metal components 20 and 21.

The radially inner portion 24 of the component 20 constitutes a frustum of a hollow cone and its smaller-diameter end includes a cylindrical extension or seat 25 which is surrounded by the inner race 26 of the antifriction bearing 3. The axial length of the tubular (cylindrical) radially outer portion 23 of the component 20 is selected in such a way that this portion surrounds several convolutions 19 of the spring 18. The radially extending disc- or washer-like median portion 22 of the component 20 has several openings or windows 27 in at least partial register with openings or windows 28 in the radially inner portion or section 29 of the primary flywheel 2; such windows 27, 28 establish paths for the shanks of the threaded fasteners 30 which serve to secure the component 20 and the flywheel 2 of the apparatus 1 to the crankshaft or camshaft of the internal combustion engine in the motor vehicle which utilizes the improved torsional vibrations damping apparatus.

The component 21 of the output member of the apparatus 1 has a substantially cylindrical radially inner portion 31 which surrounds the outer race 26a of the antifriction bearing 3 and is of one piece with the radially extending washer- or disc-shaped median portion 32 of the component 21. The tubular (such as cylindrical) radially outer portion 33 of the sheet metal component 21 surrounds several adjacent (right-hand) convolutions 19 of the spring 18. The portions 25, 31 of the components 20, 21 cooperate with the races 26, 26a of the bearing 3 to center the flywheels 2, 5 so that their axes coincide when the apparatus 1 is properly assembled.

The left-hand end of the radially outer portion 33 of the component 21 comprises a radially outwardly projecting washer-like extension 34 which is affixed to the counter-pressure plate 8 (i.e., to the secondary flywheel 5) by rivets 35 and/or in any other suitable way. The extension 34 is disposed between the radially extending portion or section 29 of the primary flywheel 2 and the adjacent side of the counterpressure plate 8.

Figure 2:
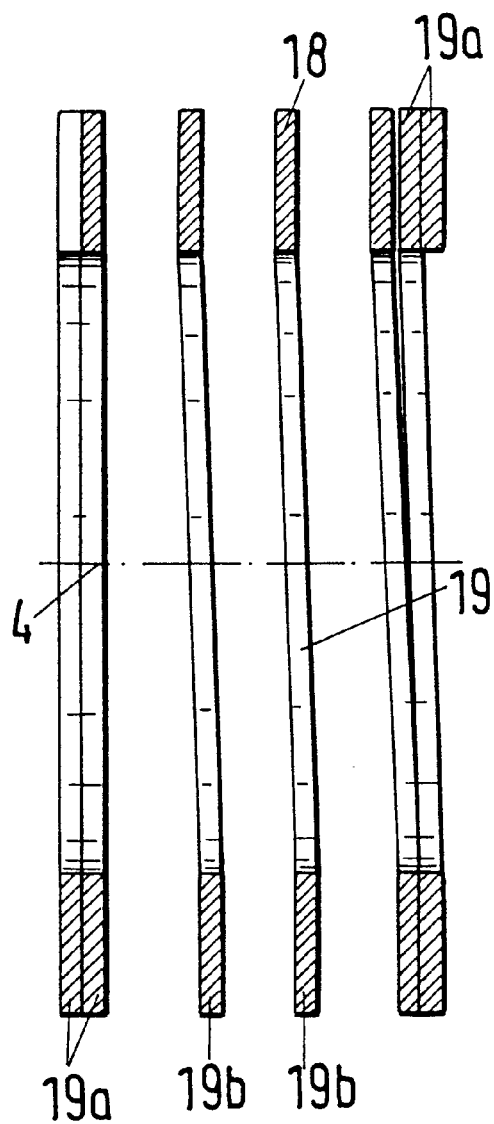
FIG. 2 is an axial sectional view of torque transmitting means similar to that utilized in the apparatus of FIG. 1 and being shown in a condition it assumes prior to mounting between the input and output members of the apparatus.
Figure 3:
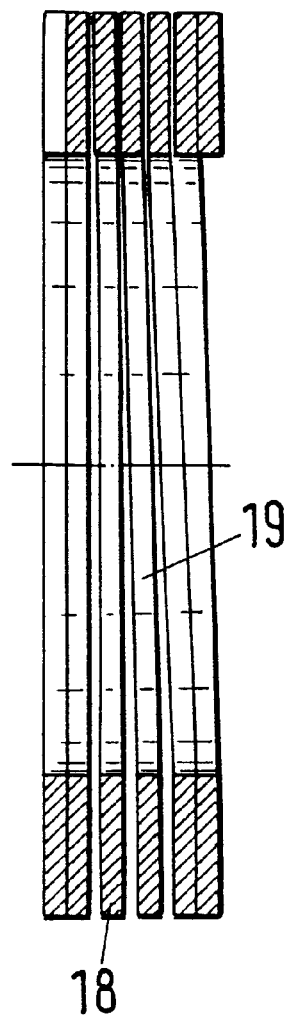
FIG. 3 illustrates the torque transmitting means of FIG. 2 in axially and radially stressed condition.

FIG. 2 shows a spring 18 in the unstressed condition in which at least some of its convolutions are spaced apart from each other as seen in the axial direction of the spring. On the other hand, FIG. 3 shows the spring 18 of FIG. 2 in a stressed condition in which its convolutions are closely adjacent and (can or do) actually abut each other. The number of the convolutions 19 and/or the cross-sectional areas and/or the diameters of the convolutions 19 depend upon the intended use of the apparatus which employs such spring, i.e., on the magnitude of the torque to be transmitted between the flywheels 2, 5 under various circumstances of use of the apparatus, namely during various stages of operation of the motor vehicle. The selection of various parameters of the spring 18 determines the magnitude of those stresses which develop in the convolutions 19, the extent of radial and/or axial deformability of the spring 18 and/or the maximum permissible and/or possible angular displacement of the flywheels 2, 5 relative to each other.

The spring 18 of FIGS. 2 and 3 is not exactly identical with the (similarly referenced) spring 18 of FIG. 1 because the spring of FIGS. 2 and 3 comprises fewer convolutions. However, and for all practical purposes, the spring 18 of FIGS. 2 and 3 is, or can be considered to be, a structural and functional equivalent of the spring 18 in the apparatus 1 of FIG. 1.

As shown in FIG. 2, the configuration of the unstressed (or not fully stressed) spring 18 can be such that pairs of its end convolutions 19a abut or are closely adjacent each other but the intermediate convolutions 19b are axially spaced apart from one another and from the respective pairs of end convolutions 19a. The arrangement can be such that only the end convolutions 19a at one axial end of the spring 18 actually abut or are closely adjacent each other when the spring is permitted to assume an unstressed condition. In other words, the pitch of the convolutions 19a at one or both axial ends of the unstressed spring 18 can depart from the pitch of the remaining (i.e., at least the central or median) convolutions 19b of such spring.

When the spring 18 is properly installed between the components 20 and 21, one end convolution 19a of one of the two pairs of outermost convolutions 19a bears against the radially extending portion 22 of the component 20 and one end convolution 19a of the other pair of such end convolutions bears against the radially extending portion 32 of the component 21. This alone suffices to ensure the transmission of certain torque between the flywheels 2 and 5 when the flywheel 2 is driven by the combustion engine or when the flywheel 5 drives the flywheel 2 while the motor vehicle is coasting. Such transmission of torque is attributable to axial stressing of the spring 18 between the components 20 and 21.

FIGS. 2 and 3 show that all of the convolutions 19 (i.e., the convolutions 19a as well as the convolutions 19b) of a spring 18 can have identical outer diameters. However, and as clearly shown in FIG. 1, it is also possible (and can be of considerable advantage) to select the dimensions of the convolutions 19 is such a way that the outer diameters of certain convolutions (e.g., at least the end convolutions 19a) exceed the outer diameters of other convolutions (such as 19b). As also shown in FIG. 1, the outer diameters of all intermediate convolutions 19b need not be identical; these convolutions can include larger-diameter outer convolutions 19b and one or more smaller-diameter central convolutions. The outer diameters of the convolutions can decrease (either gradually or in a more or less pronounced stepwise fashion) from the axially outermost end convolutions 19a toward the axially central or innermost convolution or convolutions 19b. Still further, it is possible to configurate the spring 18 in such a way that the outer diameters of its convolutions decrease from one axial end toward the other axial end.

It is equally within the purview of the invention to configurate the spring 18 in such a way that the inclination or pitch of all of its convolutions 19 is the same, i.e., that the axial spacing of the convolutions forming the two pairs of end convolutions 19a relative to each other is the same (or nearly the same) as that of the intermediate convolutions 19b relative to each other. In other words, the spring 18 can resemble or constitute a standard helical coil compression spring with or without ground ends.

The spring 18 of FIG. 1 is installed between the components 20, 21 in such a way that at least one of its left-hand end convolutions 19a is stressed radially inwardly by the internal surface of the portion 23 of the component 20, and that at least one of its right-hand end convolutions 19a is stressed radially inwardly by the internal surface of the radially outer portion 33 of the component 21. It is presently preferred to install the spring 18 in such a way that several (e.g., two) left-hand end convolutions 19a are under radial stress by the portion 23 of the component 20 as well as that several (e.g., two) of its right-hand end convolutions 19a are under radial stress by the portion 33 of the component 21.

Furthermore, the radial stressing of one or more left-hand end convolutions 19a by the portion 23 need not be the same as the radial stressing of one or more right-hand end convolutions 19a by the portion 33. For example, the portion 23 can be designed and dimensioned to subject to a radial stress a single left-hand end convolution 19a whereas the portion 33 stresses at least two right-hand end convolutions 19a, or vice versa. Moreover, the portion 23 can stress two neighboring end convolutions 19a to the same extent, and the portion 33 can stress two neighboring end convolutions 19a to a different extent, or vice versa.

Still further, the extent of frictional engagement between the annular portions 23, 33 on the one hand and the adjacent end convolutions 19a on the other hand can be regulated or influenced by appropriate selection of the material of the spring 18 and/or components 20, 21 and/or by coating the abutting portions of the spring 18 and/or the components 20, 21 with layers or films or friction enhancing or friction reducing material and/or by appropriate selection of the finish of such abutting surfaces.

The magnitude of friction between the spring 18 and the components 20, 21 can also be controlled by appropriate selection of the cross-sectional areas of the convolutions 19 and/or by an appropriate selection of the outer diameters of such convolutions. For example, the frictional engagement between the component 20 and the left-hand end convolutions 19a will be more pronounced than that between the portion 33 and the right-hand end convolutions 19a if the inner diameter of the portion 23 is less than the inner diameter of the portion 33 but the outer diameters of all end convolutions 19a (in the unstressed condition of such end convolutions) are the same. Analogously, the frictional engagement between the portion 23 and the adjacent (surrounded) end convolution(s) 19a will be different from that between the portion 33 and the adjacent end convolution (s) 19a if the inner diameters of the portions 23, 33 are the same but the outer diameter of at least one end convolution 19a within the portion 23 departs from the outer diameter of at least one end convolution 19a within the portion 33.

Figure 4:
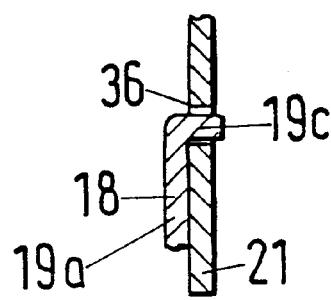
FIG. 4 is a fragmentary axial sectional view of a modified apparatus wherein one end portion of a resilient element forming part of the torque transmitting means is form-lockingly connected to the output member of the apparatus.

It is further within the purview of the invention to provide a positive (such as form-locking) connection between the spring 18 and one of the components 20, 21, i.e., to establish a mere frictional engagement between the spring 18 and the other of the components 20, 21. In other words, it is possible to fixedly secure the spring 18 to the component 20 or 21, and to establish a mere frictional engagement between such spring and the other of the components 20, 21. This is shown in FIG. 4 wherein the free terminal portion or tip 19c of the right-hand end convolution 19a of a modified spring extends in substantial parallelism with the axis of the spring into a recess 36 (e.g., a slot) of a modified component 21. The illustrated form-locking connection 19c, 36 can be replaced with another suitable positive connection, e.g., a connection employing a rivet, a screw and/or a welded seam or spot. If a form-locking or another positive connection is provided, it is often preferred to select or employ a connection which acts as a pivot or fulcrum, i.e., which permits a certain amount of angular and/or other movement between the end convolution (such as the end convolution embodying the tip 19c of FIG. 4) and the adjacent component (such as the component 21 shown in FIG. 4). The form-locking connection 19c, 36 of FIG. 4 constitutes a joint which permits at least some angular movements of the tip 19c relative to the component 21.

The apparatus 1 of FIG. 1 can be constructed and assembled in such a way that it employs the form-locking connection of FIG. 4 between the right-hand end convolution 19a of the spring 18 and the component 21, or that it employs a similar or identical or analogous form-locking connection between the left-hand end convolution 19a of the spring 18 and the adjacent component 20.

In accordance with a presently preferred embodiment, the outer diameters of the end convolutions 19a (in the unstressed condition of the spring—see FIG. 2) can exceed the inner diameters of the portions 23, 33 by 1 to 4 mm. The difference can be greater between the outer diameters of the left-hand end convolutions 19a and the inner diameter of the portion 23 than between the outer diameters of the right-hand end convolutions 19a and the inner diameter of the portion 33, or vice versa. Moreover, the difference within the range of 1 to 4 mm is mentioned solely by way of example, i.e., such difference can exceed (e.g., even greatly exceed) 4 mm or it can be even less than 1 mm.

When the flywheels 2, 5 are caused to turn relative to each other (and assuming that the apparatus 1 employs a spring 18 of the type shown in FIG. 1 or in FIGS. 2–3), the spring 18 functions as follows:

If the flywheel 2 is caused to transmit torque to the flywheel 5 because it is driven by the engine of the motor vehicle (i.e., if the vehicle is in the process of pulling a load), certain end convolutions 19a of the spring 18 are subjected to radial stresses because they are in frictional engagement with the portion 23 of the component 20. At the same time, the radially inwardly deformed right-hand end convolutions 19a of the spring 18 tend to expand and bear against the internal surface of the portion 33 of the component 21. In addition, even if the end convolutions 19a were not installed in a radially stressed condition, they nevertheless tend to expand radially outwardly when the flywheel 2 drives the flywheel 5 so that they bear against the internal surfaces of the portions 23 and 33. In other words, the rigidity of the spring 18 increases (e.g., gradually) as a function of the increase of the outer diameters of its end convolutions 19a. This is attributable to the fact that the extent of movability of the resilient element including the end convolutions 19a radially of the portions 23, 33 of the respective components 20, 21 decreases as the flywheel 2 transmits torque to the flywheel 5 (i.e., as the component 20 transmits torque to the component 21) because the area or extent of contact between the end convolutions 19a and the internal surfaces of the portions 23, 33 increases progressively or gradually. When the radial expansion of the end convolutions 19a against the portions 23, 33 is terminated (completed), the yieldability of the spring 18 (while the vehicle is in the process of pulling a load) has reached its upper limit or is very close to such upper limit. In other words, the end convolutions 19a and the portions 23, 33 are in a maximal frictional engagement with each other, and the magnitude or extent of such frictional engagement is a function of the extent of radial bending or stressing of the spring 18.

The magnitude of the torque which the spring 18 can transmit from the flywheel 2 to the flywheel 5 while the motor vehicle is in the process of pulling a load can be selected with a high degree of accuracy (even if one takes into consideration the unavoidable and/or expected tolerances) by appropriate selection of the number of end convolutions 19a which tend to expand against the internal surfaces of the portions 23, 33. In other words, the designer of the apparatus 1 can readily select the magnitude of that torque which must be transmitted from the flywheel 2 to the flywheel 5 in order to enable the component 20 to begin to turn relative to the component 21 about the common axis 4.

It is also possible to design and install the spring 18 (or an equivalent spring) in such a way that it is self-locking when the vehicle is called upon to pull a load, i.e., when the flywheel 2 transmits torque to the flywheel 5. In other words, the apparatus 1 then operates in such a way that the component 20 cannot turn relative to the component 21 when the transmission of torque takes place in a direction from the engine to the transmission of the motor vehicle.

If the spring 18 is to limit the magnitude of the torque which can be transmitted from the component 20 to the component 21 while the vehicle is pulling a load, the torque at which the component 20 begins to turn relative to the component 21 can be selected in such a way that it is a multiple of the engine torques e.g., between two and three times the maximum engine torque. The range (between two and three times) can be extended beyond three times or narrowed to less than two times.

It is also possible to modify the apparatus 1 of FIG. 1 in such a way that its torque transmitting means comprises a plurality of springs (e.g., two identical or different springs). For example, one of two springs can be confined within the other spring so that one obtains a composite spring with several layers of convolutions. It goes without saying that such modification necessitates an appropriate selection of the dimensions and of the number of convolutions of each of two or more springs so as to conform the dimensions of the composite torque transmitting means to the dimensions of the space which is available therefor between the input and output members of such modified apparatus.

The bearing 3 must be designed to reliably take up the axial forces which the spring 18 or an equivalent spring exerts upon the components 20, 21 (i.e., upon the flywheels 2, 5) as a result of axial compression from the condition shown in FIG. 2 to that shown in FIG. 3. In other words, the radially inner portions 25, 31 of the components 20, 21 must cooperate with the respective races 26, 26a of the bearing 3 in such a way that the axial positions of these races relative to each other remain unchanged. The same holds true for the axial positions of the spherical rolling elements in the bearing 3 relative to the races 26 and 26a. A presently preferred mode of securing the races of an antifriction bearing against axial displacement relative to each other in spite of pronounced axially oriented stresses upon such races is disclosed, for example, in the German patent application No. 195 32 463 to which reference may be had if necessary. It is also possible to provide the apparatus with ring-shaped and/or otherwise configurated securing means which operate between the portions 25, 31 and the respective races 26, 26a to prevent excessive (or any) axial shifting of the bearing 3 and the components 20, 21 relative to each other and/or to prevent any (or any appreciable) axial shifting of the races 26, 26a relative to each other. Still further, it is possible to deform parts of the races 26, 26a against the respective portions 25, 31 and/or vice versa and to thus prevent any uncontrolled (excessive) axial displacements of the bearing 3 and the components 20, 21 of the input and output members with reference to each other.

When the motor vehicle is coasting (i.e., when the engine and the primary flywheel 2 act as a brake in that they tend to reduce the RPM of the input shaft of the transmission and of the secondary flywheel 5), e.g., because the vehicle is travelling along a downwardly sloping road surface, the spring 18 is stressed in such a way that the diameters of its convolutions 19 tend to decrease. During an initial stage of coasting of the vehicle, the diameters of the median or intermediate convolutions 19b decrease ahead of (i.e., prior to) those of the end convolutions 19a because the end convolutions 19a have undergone at least some radial deformation during introduction into the annular portions 23, 33 of the respective components 20, 21. The reduction of diameters of the intermediate convolutions 19b entails the generation of forces which act upon the radially deformed end convolutions 19a and which bring about a gradual reduction of radial stressing of the end convolutions 19a, i.e., this results in a reduction of friction- or slip torque between the spring 18 on the one hand and the components 20, 21 on the other hand. In addition, such forces bring about (or at least tend to bring about) a reduction of the diameters of the end convolutions 19a, i.e., a reduction of the overall area of frictional contact between the end convolutions 19a and the internal surfaces of the respective annular portions 23, 33. This, too, entails a gradual reduction of the friction- or slip torque between the spring 18 and the components 20, 21. When the so-called coasting torque (namely the torque which the secondary flywheel 5 tends to transmit to the primary flywheel 2 while the motor vehicle is coasting)

exceeds the torque which the spring 18 can transmit from the component 21 to the component 20, the component 21 begins to slip relative to the component 20. Such slip can be due to turning of the portion 33 relative to the right-hand end convolutions 19a and/or to the turning of the left-hand end convolutions 19a relative to the portion 23.

The just discussed slip of the component 20 relative to the component 21, or the other way around, will take place also when the torsional vibrations between the flywheels 2 and 5 exhibit highly pronounced peaks, i.e., in response to abrupt and highly pronounced rises of the torque which is being transmitted from the flywheel 2 to the flywheel 5 or vice versa. Such situations can arise in response to the development of a resonance condition, for example, during starting or during turning off of the combustion engine in a motor vehicle.

The magnitude of the torque which is being transmitted by the spring 18 between the flywheels 2 and 5 is a function of the RPM. Thus, the centrifugal force which develops in response to rotation of the flywheels 2, 5 and acts upon the spring 18 urges the end convolutions 19a of the spring against the internal surfaces of the portions 23, 33 of the components 20, 21 to thus increase the magnitude of the torque which can be transmitted between such components. In fact, the centrifugal force can even cause the median convolutions 19b to bear against the internal surface of the portion 23 and/or 33 to thus even further increase the magnitude of the torque which can be transmitted between the flywheels 2 and 5 in response to increasing RPM of such flywheels. The just described influence of the centrifugal force upon the magnitude of the torque being transmitted by the spring 18 is felt regardless of whether the motor vehicle pulls a load or is coasting.

If a composite flywheel (such as the apparatus 1 of FIG. 1) is designed in such a way that the magnitude of the torque which the spring 18 can transmit when the RPM of the flywheels 2, 5 is so low that the centrifugal force cannot enhance (or cannot sufficiently enhance) the frictional engagement between the end convolutions 19a and the portions 23, 33 of the components 20, 21 to set the vehicle in motion by exerting a required pulling or pushing force, the apparatus 1 is or can be equipped with an auxiliary torque transmitting assembly 37 which operates between the flywheels 2 and 5 when the RPM is zero or does not match or approximate the idling RPM of the engine. The assembly 37 is effective when the drag torque of the engine exceeds the torque which can be transmitted by the spring 18 during the corresponding stage of operation of the motor vehicle.

The assembly 37 cooperates with the spring 18 to raise the magnitude of the torque which can be transmitted between the flywheels 2 and 5 to a level above that of the drag torque of the combustion engine which normally drives the flywheel 2 and the component 20. The illustrated assembly 37 comprises a coil spring or torsion spring 38 which is or which can be made of a resilient wire having a circular cross-sectional outline. The torque transmitting action of the spring 38 is identical with or is clearly analogous to that of the spring 18 except that the two springs are installed to act in opposite directions. In other words, the torque transmitting action of the spring 18 increases when the torque transmitting action of the spring 38 decreases, and vice versa.

The convolutions 39 of the spring 38 surround a cylindrical surface 40 of the secondary flywheel 5; more specifically, the cylindrical surface 40 is an external surface of the annular section 11 which establishes a connection between the counterpressure plate 8 of the secondary flywheel 5 and the housing 12 of the friction clutch 6. The arrangement is such that the spring 38 is mounted on the annular section 11 in a prestressed condition, i.e., the convolutions 39 bear upon and thus frictionally engage the cylindrical surface 40. In other words, the inner diameters of the convolutions 39 are smaller than the diameter of the cylindrical surface 40 when the spring 38 is detached from the annular section 11 or before the spring 38 is slipped onto or otherwise installed on the cylindrical surface 40.

An end portion 41 of one end convolution 39 of the spring 38 extends in at least substantial parallelism with the axis 4 and is received in a complementary recess or socket 42 of the radially outer portion or section of the primary flywheel 2. Thus, the end portion 41 is form-lockingly connected with the flywheel 2. The other end portion of the coil spring 38 is not affixed to the secondary flywheel 5, i.e., such other end portion is movable relative to the output member of the apparatus.

When the motor vehicle is coasting, i.e., when the clutch 6 is engaged so that the clutch disc 10 can transmit torque from the flywheel 5 to the flywheel 2, the convolutions 39 of the spring 38 are tightened around the cylindrical surface 40 to thus promote (i.e., contribute to) the transmission of torque from the flywheel 5 to the flywheel 2. Consequently, the flywheel 2 receives torque which is required to effect a starting of the combustion engine. The flywheel 2 carries the starter gear.

The radial stressing of the convolutions 39 forming part of the spring 38 is selected in such a way that this stressing decreases in response to the action of centrifugal force upon the spring 38 and is reduced all the way to zero at a certain value of the RPM of the secondary flywheel 5. It is often desirable to select the RPM at which the frictional engagement between the convolutions 39 and the surface 40 is terminated by centrifugal force in such a way that this RPM is less than the idling RPM of the engine. In other words, the ability of the spring 38 to transmit torque between the flywheels 2 and 5 is preferably terminated in its entirety shortly or immediately before the RPM of the flywheel 5 reaches the idling RPM of the engine. However, this is not a prerequisite for a satisfactory operation of the assembly 37, i.e., it is equally possible (and even preferable under certain circumstances) to select the operation of the assembly 37 in such a way that the ability of the spring 38 to transmit torque between the flywheels 5, 2 is fully terminated (or at least greatly reduced) when the RPM of the flywheel 5 actually reaches or even exceeds the idling RPM of the engine.

The ability of the spring 38 to transmit torque by friction between the flywheels 5, 2 preferably decreases gradually in response to increasing RPM, i.e., in response to increasing centrifugal force. In other words, such reduction of the transmission of frictional torque between the flywheels 5, 2 preferably takes place while the RPM of the flywheels 2, 5 increases within a wide or even very wide range.

FIG. 1 further shows that the convolutions 39 of the spring 38 are surrounded by a cylindrical internal surface 43 of the flywheel 2. The convolutions 39 actually engage the internal surface 43 (if at all) when they are disengaged from the cylindrical external surface 40 of the annular section 11, i.e., when such convolutions are disengaged from the secondary flywheel 5. The surface 43 surrounds an axially parallel annular recess in the radially outer portion of the primary flywheel 2.

When the RPM of the flywheels 2, 5 is below that value at which the convolutions 39 of the spring 38 become disengaged from the cylindrical external surface 40 of the annular section 11, the convolutions 39 produce an additional frictional hysteresis. Such hysteresis has a positive influence or effect in most instances because it can effectively suppress the undesirable resonance which tends to develop within certain RPM ranges during starting and/or during turning off of the combustion engine.

An important advantage of the feature that the spring 18 is not positively (e.g., form-lockingly) connected with the input member (2, 20) as well as with the output member (5, 21) of the apparatus 1 (or is in mere frictional engagement with both such members) is that the input and output members can turn relative to each other when the magnitude of the torque being transmitted from the input member to the output member or in the opposite direction reaches a predetermined value, namely a value at which one or more constituents of the apparatus 1 would be likely to undergo excessive stresses which could lead to breakage or to unpredictable operation of the apparatus. This advantage is achieved by the simple expedient of ensuring that the frictional engagement between the spring 18 and the component 20 and/or 21 can rise only to a predetermined value but that such frictional engagement is overcome when the predetermined value is reached or exceeded. It is particularly desirable to ensure that the frictional engagement between the spring 18 and the component 20 and/or 21 permits rotation of the flywheels 5, 2 relative to each other when the vehicle is coasting and the magnitude of the torque being transmitted from the flywheel 5 (component 21) to the flywheel 2 (component 20) rises to a predetermined maximum permissible value, i.e., it is particularly desirable and important to limit the magnitude of the torque which can be transmitted from the transmission to the output shaft of the engine.

Of course, and as already described hereinbefore, it is equally possible (and normally desirable) to design the improved apparatus in such a way that it limits the magnitude of the torque which can be transmitted from the flywheel 2 to the flywheel 5 or that it imposes a limit upon the magnitude of the torque which can be transmitted between the flywheels 2 and 5 in either direction. Furthermore, the limit in one of these directions can but need not be the same as the limit in the other direction.

The magnitude of the torque which can be transmitted between the flywheels 2 and 5 is a function of the strength of frictional engagement between the convolution(s) of the spring 18 and the component 20 and/or 21. The just mentioned strength is a function of the extent of radial deformation (bending) of those end convolutions which are in frictional contact with the internal surface of the portion 23 and/or 33 of the component 20 and/or 21. The extent of radial engagement of the end convolutions 19a with the internal surface of the portion 23 and/or 33 is dependent upon the magnitude of the torque being transmitted between the flywheels 2 and 5, upon the direction of rotation of the flywheels 2 and 5, and upon the direction of winding of the convolutions 19. Still further, the magnitude or the extent or the strength of frictional engagement between the spring 18 and the component 20 and/or 21 is a function of the RPM of the flywheels, i.e., a function of the magnitude of centrifugal force acting upon the convolutions 19 including those convolutions which are in radial engagement with the adjacent internal surface or surfaces.

It is further possible to design and install the spring 18 (or an equivalent spring) in such a way that one or more median or intermediate convolutions 19b are in frictional engagement with the internal surface of the portion 23 or 33 and that one or more end convolutions 19a are in a frictional or in a form-locking engagement with the internal surface of the portion 33 or 23.

If the spring 18 is mounted in a manner as shown in FIG. 1, the diameters of the median or intermediate convolutions 19b increase or decrease when one of the flywheels 2 and 5 turns relative to the other flywheel so that the intermediate convolutions thus determine the extent of angular movability of the flywheels relative to each other before the end convolutions 19a begin to slip relative to the internal surface of the portion 23 and/or 33. If the intermediate convolutions 19b are caused to increase their outer diameters and to frictionally engage the portion 23 and/or 33, they determine the magnitude of that torque which is required to permit the spring 18 to slip relative to the component 20 and/or 21. In fact, the frictional engagement between the (radially expanded) intermediate convolutions 19b and the component 20 and/or 21 can be so pronounced that the convolutions 19b form part of a form-locking connection between the spring 18 and the portion 23 and/or 33.

The convolutions 19 of the spring 18 can have polygonal (such as square or rectangular), oval or circular cross-sectional outlines. Resilient wire like-materials which can be utilized for the making of the spring 18 and/or 38 are disclosed, for example, in the German Industrial Norm (DIN) No. 2088.

Figure 5:
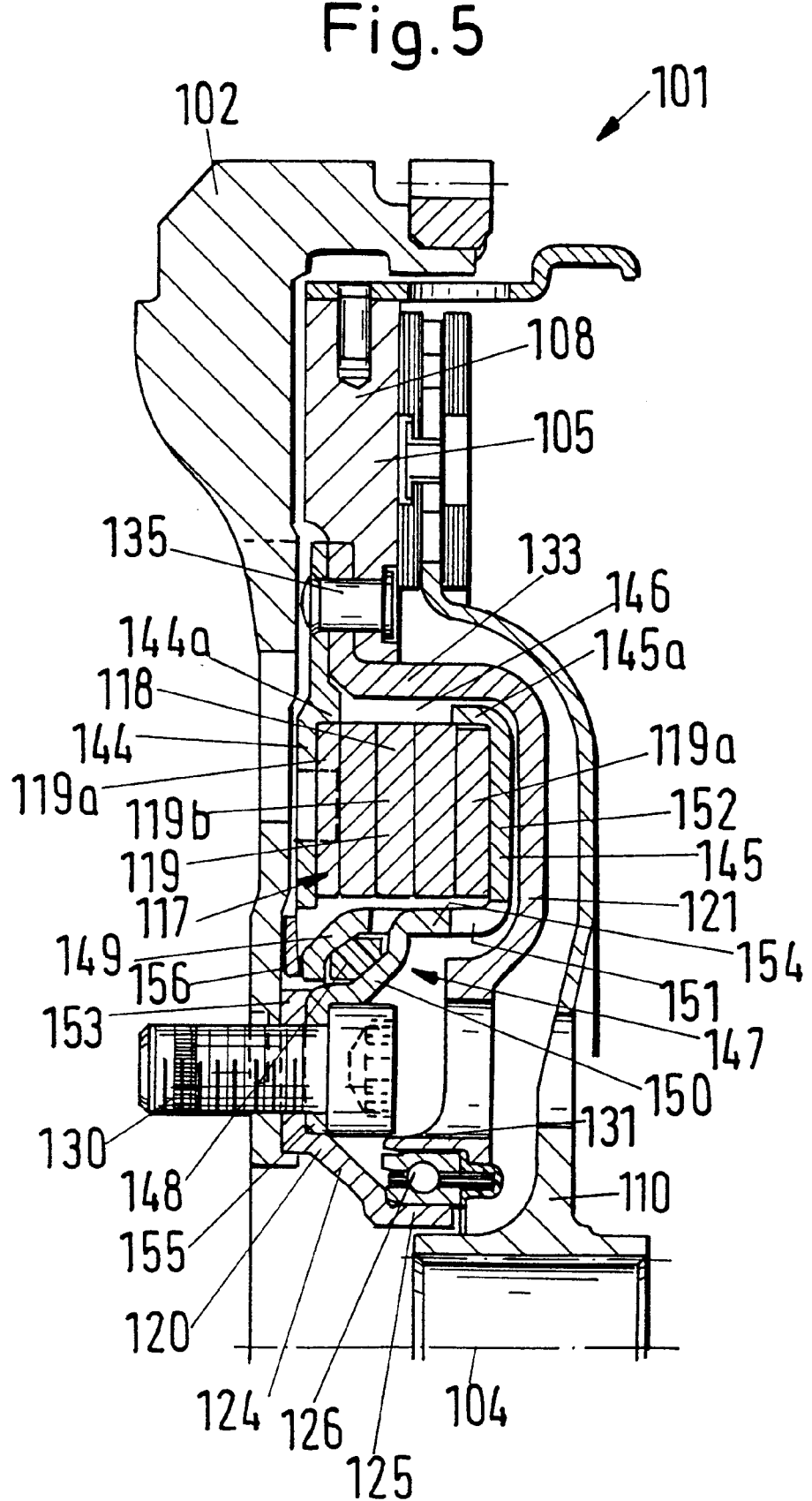
FIG. 5 is a fragmentary axial sectional view of a torsional vibrations damping apparatus which constitutes a modification of the apparatus shown in FIG. 1.

The apparatus (composite flywheel) 101 of FIG. 5 is similar to the apparatus 1 of FIG. 1. It comprises a primary flywheel 102, a secondary flywheel 105 and a torque transmitting device or damper 117 including a spring 118 having convolutions 119 spacedly surrounding the common axis 104 of the flywheels 102, 105. The convolutions 119 are dimensioned and installed and stressed and operate in a manner analogous to that described with reference to the convolutions 19 of the spring 18.

The mounting of the spring 118 departs from that of the spring 18 in that the manner in which the end convolutions 119a of the spring 118 cooperate with the flywheels 102 and 105 is reversed. Thus, at least one left-hand end convolution 119a of the spring 118 is in frictional engagement with a disc- or washer-like part 144 which is fixedly (non-rotatably) connected with the secondary flywheel 105. At least one right-hand end convolution 119a of the spring 118 is in frictional engagement with an annular part 145 which (at least during certain stages of operation of the motor vehicle embodying the apparatus 101 of FIG. 5) is rigidly (non-rotatably) secured to the primary flywheel 102. It will be seen that the interaction of forces between the spring 118 and the flywheels 102, 105 is reversed with reference to the interaction of forces between the spring 18 and the flywheels 2, 5. An advantage of the apparatus 101 of FIG. 5 is that the axial forces which develop as a result of changes of the diameters of the convolutions 119 and act upon the parts 144, 145 cannot effect an axial shifting of the antifriction bearing 126 and the adjacent portions or seats 125, 131 relative to each other.

FIG. 5 further shows that axial forces, if any, which are generated by the spring 118 and act upon the parts 144, 145 tend to move the flywheels 102 and 105 axially and toward each other; this causes the seats 125, 131 to exhibit a tendency to move in directions (to the right as far as the seat 125 is concerned, and to the left as far as the seat 131 is concerned) to even more reliably confine the bearing 126 between them.

The aforediscussed axially oriented forces can or could be generated by the spring 118 as a result of a reduction of the diameters of its convolutions 119; such reduction entails an axial lengthening of the spring 118 which, in turn, entails an axial movement of the flywheels 102, 105 toward each other.

In order to ensure proper (predictable or optimal) deformation of the convolutions 119, i.e., to achieve a predetermined hysteresis, the lateral sides of the convolutions 119 can be coated with films or layers of a suitable material such as Teflon (registered trademark). Alternatively, the just mentioned coating can be replaced with suitable (e.g., sheet-like) inserts of a material exhibiting properties similar to those of Teflon. It is desirable to select coatings or inserts which enhance the frictional hysteresis developing as a result of movements of neighboring convolutions 119 relative to each other.

The seat 125 constitutes the cylindrical or substantially cylindrical radially innermost part of a hollow frustoconical portion 124 which is affixed to the primary flywheel 102. The seat 131 forms part of an annular component 121 which is affixed to the secondary flywheel 105. The radially outermost portion of the component 121 is fixedly connected to the counterpressure plate 108 of the friction clutch. Rivets 135 are provided as a means for fastening the part 144 to the annular component 121 and to the counterpressure plate 108. The component 121 and the part 144 together constitute a substantially box-shaped enclosure or receptacle defining an annular space or chamber 146 for the spring 118. The ring-shaped part 145 extends radially outwardly into and within the chamber 146 between the component 121 and the part 144. At least the radially outer or outermost portion of the chamber 146 is or can be sealed so that this chamber can receive and retain a supply of preferably viscous (such as highly viscous) material, e.g., a grease, which acts as a lubricant for the convolutions 119 of the spring 118. In addition, the pasty material in the chamber 146 can produce a desirable viscous damping action.

If desired, the radially inner portion of the chamber 146 can also be sealed in order to even further reduce the likelihood of uncontrolled escape of a pasty viscous substance even though such substance normally gathers in the radially outer portion of the chamber 146 under the action of centrifugal force to thereupon remain in such radially outer portion due to its pronounced viscosity. The seal or seals for the radially inner portion of the chamber 146 can be established between the part 144 and the primary flywheel 102 as well as between the part 145 and the component 121.

The right-hand end convolution 119a of the spring 118 is received, in a radially stressed condition, within the axially extending radially outer portion 145a of the part 145. The left-hand end convolution 119a of the spring 118 is confined, in a radially stressed condition, in an axially extending radially outermost portion 144a of the part 144. Alternatively, or in addition to such frictional engagement, the left-hand end convolution 119a can be form-lockingly secured to the part 144; for example, such form-locking connection can be similar or analogous to those which were described with reference to the embodiment of FIG. 1 and one of which is shown in FIG. 4.

When the vehicle embodying the apparatus 101 of FIG. 5 is in the process of pulling a load, the flywheel 102 tends to turn relative to the flywheel 105 in such a way that the diameters of the median or intermediate convolutions 119b of the spring 118 tend to increase and, in response to a predetermined angular displacement of the flywheel 102 relative to the flywheel 105, the convolutions 119b actually engage the cylindrical internal surface of the radially outer portion 133 of the component 121. From there on, the function of the spring 118 is the same as that of the spring 18 in the apparatus 1 of FIG. 1. Thus, the spring 118 can terminate or interrupt any further angular displacement of the flywheels 102, 105 relative to each other (while the vehicle is pulling a load) and it can limit the magnitude of the torque which can be transmitted between the two flywheels in that it cooperates with the adjacent part or parts (144a and/or 145a) to permit the respective end convolution (s) 119a to slip relative to the adjacent internal surface or surfaces. In other words, the spring 118 can reliably prevent the transmission of excessive torque to the input shaft of the transmission which is arranged to receive torque from the clutch disc 110 when the clutch including the counterpressure plate 108 is engaged while the engine drives the primary flywheel 102. The spring 118 also serves to prevent the transmission of short-lasting peaks of torque from the primary flywheel 102 to the secondary flywheel 105 and thence to the transmission.

When the vehicle embodying the apparatus 101 of FIG. 5 is coasting, any angular displacement of the secondary flywheel 105 relative to the primary flywheel 102 extails a stressing of the spring 118 in such a way that the diameters of the intermediate convolutions 119b decrease. The thus deformed intermediate convolutions 119b act upon the end convolutions 119a in a sense to reduce the diameters of the end convolutions and to thus weaken the frictional engagement with the internal surface of the portion 144a and/or 145a. This results in the development of a slip at least between the right-hand end convolution 119a and the portion 145a. In the absence of a positive (such as form-locking) connection between the left-hand end convolution 119a and the portion 144a, the spring 118 is permitted or caused to slip relative to the part 144. One end convolution 119a is likely to begin to slip relative to the adjacent internal surface (of 144a or 145a) ahead of the other end convolution 119a unless the frictional engagement (friction torque) between the spring 118 and the portion 144a is identical with that between the spring 118 and the portion 145a.

It will be seen that, when the vehicle is coasting and the magnitude of the torque being transmitted from the secondary flywheel 105 to the primary flywheel 102 rises to a predetermined value, the spring 118 acts as a freewheel (overrunning clutch) in that it becomes ineffective (as a means for transmitting torque from the flywheel 105 to the flywheel 102) when such predetermined value is exceeded. The arrangement is preferably such that, when the engine is called upon to pull a load, the spring 118 can transmit (from the flywheel 102 to the flywheel 105) a pronounced torque which at least matches but can exceed the engine torque; for example, such torque from the flywheel 102 to the flywheel 105 can equal or approximate between two and three times the engine torque. On the other hand, when the vehicle is coasting, the magnitude of the torque which can be transmitted from the flywheel 105 to the flywheel 102 is much less; for example, such torque can be well below the nominal engine torque. In fact, and as already mentioned hereinbefore, the spring 118 can act as a freewheel or overrunning clutch which becomes operative when the vehicle is coasting and the magnitude of the torque being transmitted from the flywheel 105 to the flywheel 102 reaches a relatively low upper threshold value.

It is often desirable and advantageous to select the magnitude of the torque which is being transmitted from the flywheel 105 to the flywheel 102 (i.e., while the vehicle is coasting) in such a way that the frictional or slip torque is sufficiently pronounced to ensure a predictable starting of the engine. In other words, the just mentioned torque can be sufficiently pronounced to ensure that the apparatus 101 of FIG. 5 can operate without the assembly 37 of FIG. 1. The assembly 37 (or an equivalent thereof) will be installed in the apparatus 101 only if the maximum torque which can be transmitted from the secondary flywheel 105 to the primary flywheel 102 (while the vehicle is coasting) does not suffice to ensure a predictable starting of the engine.

The apparatus (composite flywheel) 101 further comprises a hysteresis arrangement 147 which is (or which acts as) a slip clutch that is effective subsequent to a predetermined angular displacement of the flywheels 102, 105 relative to each other. This slip clutch 147 operates in series with the spring 118 of the torque transmitting means (damper) 117.

The illustrated slip clutch 147 is installed to operate between the annular part 145 (which can be said to constitute the input element or input member of the damper 117) and the primary flywheel 102. This slip clutch comprises a friction ring 148 which is clamped between a portion 149 borne by the component 145 and a portion 150 which is rigid with the primary flywheel 102. The portions 149, 150 constitute hollow conical frusta which flank and conform to the adjacent outlines of the friction ring 148. The portion 149 is connected with a radially extending portion or section 152 of the annular part 145 by webs or ribs 151. The portion 150 is part of a member 153 having a radially outer portion provided with tongues or prongs 154 received with clearance (as seen in the circumferential direction of the flywheels 102 and 105) between the webs 151. The member 153 further comprises a substantially disc-shaped radially inner portion 155 which centers it on and connects it to the flywheel 102.

When the apparatus 101 is installed in the power train between the engine and the transmission of a motor vehicle, i.e., when the flywheel 102 is affixed to the camshaft or the crankshaft of the engine, the fasteners 130 ensure the establishment of a rigid connection between the primary flywheel 102, the component 120, and the member 153. To this end, the parts 102, 120, 153 are provided with partially or fully registering holes or bores for the shanks of the fasteners 130.

The portion 149 of the annular part 145 is acted upon by at least one energy storing element 156 which biases it in a direction to the right, as viewed in FIG. 5, so that the friction ring 148 is maintained in a requisite frictional engagement with the portions 149, 150 (as seen in the direction of the common axis 104 of the flywheels 102 and 105). The illustrated energy storing element 156 is a diaphragm spring which is installed between a radially extending portion of the primary flywheel 102 and a radially extending portion of the annular part 145.

The magnitude of the torque which the slip clutch (hysteresis arrangement) 147 can transmit is also dependent upon the axially oriented force acting between the end convolutions 119a of the spring 118 and the adjacent parts 121, 145. Such axially oriented force enhances (i.e., it is added to) the axial bias of the diaphragm spring 156. The same as the spring 18, the spring 118 can be installed in such a way that it is subjected to an initial axial stress which is taken up by the antifriction bearing 126 on the one hand, and by the slip clutch 147 on the other hand. When the flywheels 102 and 105 are caused to turn relative to each other in a sense to enable the spring 118 to increase its axial length due to the initial stress (in the direction of the axis 104), the magnitude of the axial force acting upon the slip clutch 147 increases, i.e., such tendency of the spring 118 to increase its axial length contributes to an increase of the slip torque which is generated by the clutch 147.

When the flywheels 102 and 105 are caused to turn relative to each other, this initially entails an increase of the torque which can be transmitted by the spring 118 to a value corresponding to the slip torque of the hysteresis arrangement or slip clutch 147. When such slip torque is reached or exceeded, the clutch 147 becomes ineffective and permits the webs 151 and the prongs 154 to move relative to each other in the circumferential direction of the flywheels 102, 105 to an extent which is determined by the (circumferential) width of the slots or clearances between the webs 151. Once the prongs 154 abut the adjacent webs 151, the part 145 can no longer turn relative to the primary flywheel 102 so that, if the angular displacement of the two flywheels 102, 105 relative to each other continues in the same direction as before, the spring 118 is subjected to additional stressing and the magnitude of the torque which the spring 118 can transmit between the flywheels 102, 105 increases accordingly. Such increase of the magnitude of the torque which can be transmitted between the two flywheels continues until it reaches a value at which (during coasting of the vehicle) the spring 118 begins to slip relative to the portion 144a and/or 145a. If the vehicle is in the process of pulling a load, the magnitude of the transmitted torque increases until the spring 118 begins to act as a solid one-piece body (in that its intermediate convolutions 119b can no longer move relative to each other and relative to the end convolutions 119a because they abut the internal surface of the portion 133). It will be seen that the mode of operation of the spring 118 is in part identical with and in part clearly analogous to that of the spring 18.

FIG. 6 shows an apparatus 201 which comprises the primary flywheel 202 having the solid radially outer portion or section 257 which is an extrustion, a casting or a forging. This radially outer section 257 carries a starter gear and is riveted to the radially inwardly extending disc-shaped or washer-like radially inner portion or section 258 of a metallic sheet material. The radially inner section 258 includes a radially innermost portion which is secured to the output shaft (camshaft or crankshaft) of a combustion engine by a set of threaded bolts 230 or by other suitable fastener means.

A secondary flywheel 205 of the apparatus 201 carries a friction clutch 206 which is or which can be constructed, mounted and assembled at least substantially in the same way as described in connection with the friction clutch 6 of FIG. 1. A damper 217 of torsional vibrations operates between the flywheels 202, 205 and comprises a set of resilient elements in the form of radially inwardly and/or axially deformable coil springs 259. The apparatus 201 further comprises a slip clutch 260 which is mounted to operate in series with the damper 217.

Figure 7:
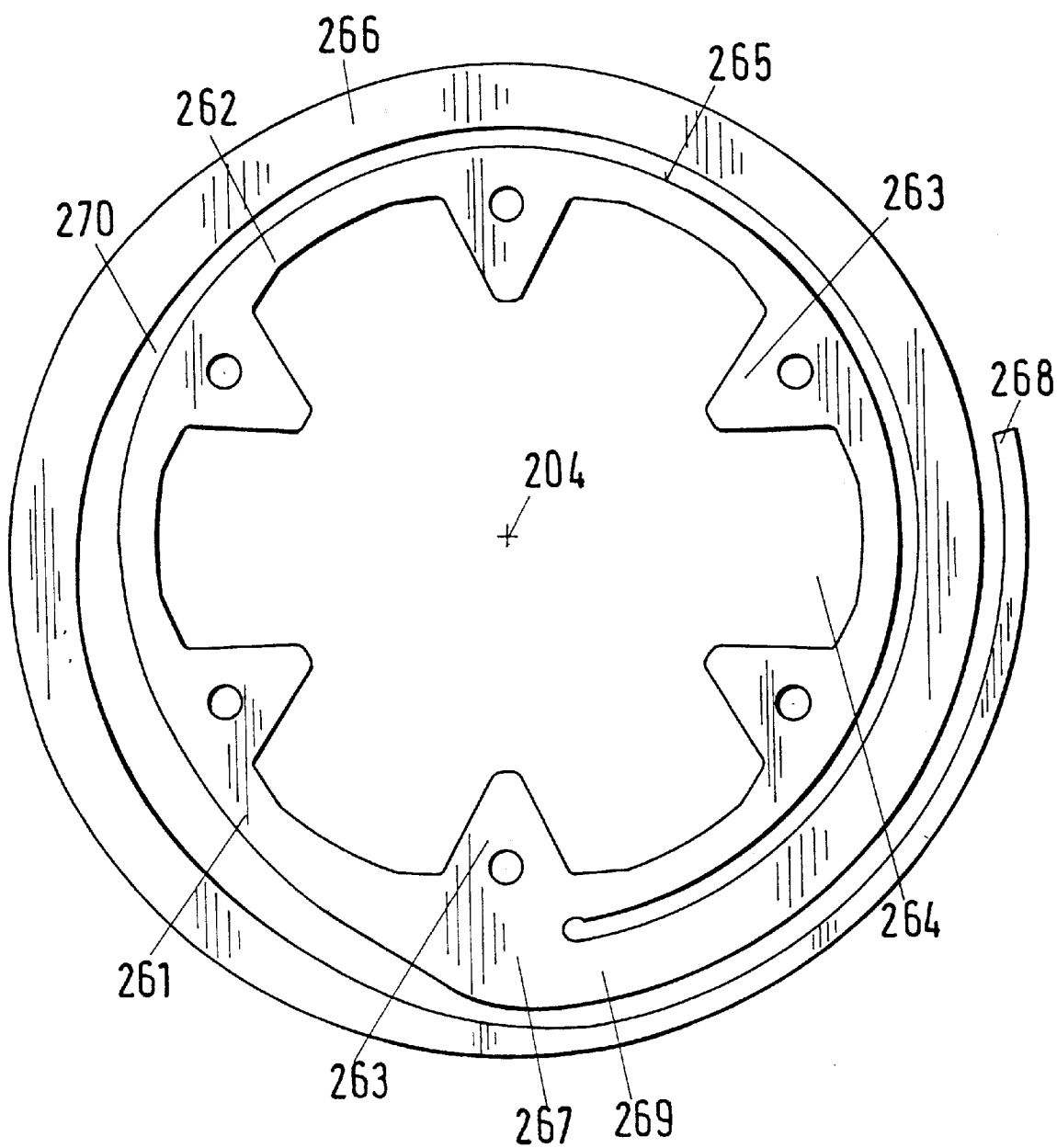
FIG. 7 is a front elevational view of a resilient element which can be utilized in the apparatus of FIG. 6.

The slip clutch 260 is effective at least when the vehicle embodying the apparatus 201 of FIG. 6 is coasting and when the magnitude of the torque being transmitted from the secondary flywheel 205 to the primary flywheel 202 exceeds a predetermined value. This slip clutch comprises a set of disc-shaped resilient elements 261 one of which is shown in FIG. 7. This resilient element 261 comprises a circumferentially complete annular portion 262 which carries a set of six equidistant radially inwardly extending arms or prongs 263 flanking the radially outer portions of six windows 264 further having radially inner portions which are not separated from each other. The windows 264 alternate with the arms 263, as seen in the circumferential direction of the annular portion 262. The radially inner portions of the illustrated arms 263 are free; however, it is within the purview of the invention to provide each resilient element 261 with an annular connector (not shown) which is secured to or which is of one piece with the radially innermost portions of the arms 263 and is coaxial with the flywheels 202, 205 (the common axis of the two flywheels is shown at 204). The just discussed connector for the radially innermost portions of the arms 263 can greatly enhance the stability of the respective resilient element 261. If the resilient elements 261 are provided with such connectors, the windows 264 which alternate with the arms 263 are fully separated from each other.

The radially outer marginal portion 265 of the circumferentially complete annular portion 262 of each resilient element 261 is of one piece with an elastically deformable resilient part 266 which is comparable to one of the convolutions 19 or 119 in that it extends circumferentially about the axis 204. The root portion 269 of the part 266 (hereinafter called convolution) is of one piece with the respective annular portion 262 (as at 267), and this convolution extends around the portion 262 along an arc of at least 90°, preferably along an arc of between 180° and 540° (for example, between 400° and 500°, most preferably about 450°). The illustrated root portion 269 is radially outwardly adjacent one of the six arms 263.

The width of the convolution 266 decreases, at least in part, in a direction from the root portion 269 toward the free end 268. The reference character 270 denotes a helical clearance or gap which is provided in part between the convolution 266 and the annular portion 262, and in part between the radially overlapping portions of the convolution 266. When the convolution 266 is not stressed in the radial direction of the resilient element 261, the gap 270 can include portions or regions having different widths, as measured radially of the axis 204. The configuration of the gap 270 is preferably such that it permits a reduction of the outer diameter of the convolution 262 at least substantially all the way between the root portion 269 and the free end 268. This renders it possible to install the resilient element 261 of FIG. 7 in the slip clutch 260 of FIG. 6 in such a way that the entire convolution 262 is maintained in a radially inwardly stressed condition.

As can be seen in FIG. 6, the resilient elements 261 of the slip clutch 260 are relatively thin and can constitute mass-produced stampings. It is also possible to resort to one or more laser beams for the making of cuts in substantially disc-shaped blanks which are to be converted into the resilient elements 261.

The convolution 266 of each resilient element 261 is resiliently deformable in the radial direction as well as in the circumferential direction of the respective annular portion 262. Moreover, the parameters of each convolution 266 (as concerns the configuration, the axial dimension (thickness) and the radial dimension (width) of each and every section of each convolution) are selected in such a way that one ensures a predictable and optimal elastic deformability of each convolution. It is particularly desirable that the convolutions 266, or any part of each such convolution, should not buckle or bend to any appreciable extent laterally, i.e., in the direction of the axis 204. In other words, the convolutions 266 should satisfy several exacting requirements as concerns their tensioning during installation as well as in actual use. Such requirements include the desirability of designing each convolution 266 in such a way that the bending stresses acting upon the convolutions are at least substantially uniform all the way from the root portion 269 at the joint 267 to the free end 268. The convolution 266 which is shown in FIG. 7 is or resembles a spiral extending around the annular portion 262 along an arc of approximately 450°.

FIG. 6 shows that the slip clutch 260 comprises three resilient elements 261 which may but need not be identical. The three resilient elements 261 are mounted side-by-side in three immediately adjacent parallel planes. The convolutions 266 of the three resilient elements 261 are received in a chamber or recess 271 of the secondary flywheel 205 in a radially stressed condition. Actually, the chamber 271 is provided in a counterpressure plate 207 of the friction clutch 206; this counterpressure plate has an annular depression or recess 272 which includes the chamber 271 for the convolutions 266 and further receives at least a portion of a wear-resistant annular shroud 273 having a substantially L-shaped cross-sectional outline. For example, the shroud 273 can be made of a hardened metallic material and, in addition, can be provided with a film or coat of a wear-resistant material which is effective at least during a reasonably long initial stage of the useful life of the apparatus 201. It is also possible to make the shroud 273 of a material which need not be highly resistant to wear if its coat or film has a thickness and/or a composition which ensures that the shroud can stand long periods of satisfactory use.

The axially extending cylindrical portion or leg 274 of the shroud 273 surrounds the convolutions 266 of the three resilient elements 261, and the radially extending washer-like portion or leg 275 of the shroud 273 is contacted by the convolution 266 of the right-hand resilient element 261 in the recess 272.

The resilient elements 261 are mounted in the recess 272 in such a way that they bear against each other in the direction of the axis 204. The bias is furnished by an elastic member 276 which bears against a washer-like insert 277 abutting the left-hand side of the left-hand resilient element 261 of the slip clutch 260 shown in FIG. 6. It suffices if the insert 277 bears upon the convolution 266 of the adjacent resilient element 261.

The feature that the convolutions 266 of the three resilient elements 261 are clamped between the insert 277 and the radially extending leg 275 of the shroud 273 ensures that the slip clutch 260 can furnish a basic friction torque the magnitude of which can be selected by appropriate selection of the bias of the elastic element 276.

It is preferred to stagger the three resilient elements 261 in the circumferential direction of the flywheels 202, 205 to thus ensure that the staggered resilient elements counterbalance each other, at least to a considerable extent. It is assumed that the three resilient elements 261 are staggered relative to each other through angles of 120°, as seen in the circumferential direction of the leg 274 of the shroud 273 in the recess 272. Moreover, the three convolutions 266 extend in the same direction, i.e., counterclockwise, as seen in FIG. 7.

The coil springs 259 of the damper 217 are received in the windows 264 between the arms 263 of the resilient elements 261 as well as in registering windows provided therefor in the radially extending section 258 of the primary flywheel 202. Still further, portions of the coil springs 259 extend into windows which are provided in a disc-shaped or washer-like part 278; the latter is non-rotatably secured to the section 258 of the primary flywheel 202. The part 278 and the section 258 include axially spaced-apart regions which flank an annular compartment 279 into which the resilient elements 261 extend radially inwardly, i.e., toward the axis 204. The arms 263 of the resilient elements 261 constitute abutments which engage the adjacent end convolutions of and stress the coil springs 259 in a circumferential direction of the primary flywheel 202 when the primary flywheel and the slip clutch 260 including the three resilient elements 261 are caused to turn relative to each other about the axis 204. The damper 217 can comprise a discrete coil spring 259 for each set of (three) aligned windows 264 in the package of resilient elements 261 forming part of or constituting the slip clutch 260.

The radially stressed convolutions 266 of the resilient elements 261 operate in a manner which is analogous to that of the end convolutions 19a of the spring 18 or the end convolutions 119a of the spring 118. Thus, as the extent and/or the intensity of engagement between the radially outer sides of the convolutions 266 on the one hand, and the internal surface of the annular leg 274 of the shroud 273 on the other hand, increases or decreases, the (slip) torque which is furnished by the clutch 260 increases or decreases accordingly. This is clearly analogous to the interaction between the end convolutions 19a or 119a and the preferably cylindrical internal surfaces of the parts 23, 33 or 144a, 145a. It will be seen that the resilient elements 261 are installed in the apparatus (composite flywheel) 201 in such a way that, when the vehicle is pulling a load (namely when the engine drives the primary flywheel 202), the radial stressing of the convolutions 266 (and hence the area and/or the intensity of contact between the convolutions 266 and the internal surface of the leg 274 of the shroud 273) increases as a result of the transmission of torque to the resilient elements 261 and, therefore, the clutch 260 can transmit a greater torque. The ability of the clutch 260 to transmit an increasing torque increases with progressing deformation of the convolutions 266 into larger-area contact with the leg 274.

If the vehicle embodying the apparatus 201 is coasting, i.e., when the transmission in the power train of the vehicle serves as a means for transmitting torque to the secondary flywheel 205, the stressing of the convolutions 266 is such that the areas of contact between their radially outermost portions and the internal surface of the leg 274 decreases (i.e., the extent of radial stressing of the convolutions 266 is reduced) so that the ability of the slip clutch 260 to transmit torque (from the flywheel 205 to the flywheel 202) decreases. When the torque which is being transmitted by the flywheel 205 and thence to the convolutions 266 rises to a preselected value, the ability of the slip clutch 260 to transmit torque decreases to a value at which the radial bias upon the convolutions 266 as well as the area of contact between the convolutions and the leg 274 are reduced to such an extent that the transmission of torque from the flywheel 205 to the flywheel 202 is interrupted.

The resilient convolutions 266 act as a band or belt or strap brake.

The friction torque which is generated as a result of radial stressing of the convolutions 266 within the annular legs 274 of the shroud 273 is superimposed upon the basic or primary friction torque which is generated as a result of axial stressing of the convolutions 266 between the insert 277 and the radial leg 275 of the shroud 273 by the elastic element 276. Axial stressing of the convolutions 266 by the elastic element 276 exhibits the additional advantage that the convolutions 266 cannot buckle sideways (in the direction of the axis 204) and that the convolutions cannot assume a (conical) shape resembling that of a diaphragm spring. Moreover, the elastic element 276 ensures the development of frictional hysteresis between the neighboring convolutions 266 which have some freedom of relative movement in the circumferential direction of the annular leg 274, particularly in view of the fact that they are staggered relative to each other in the circumferential direction of the flywheels 202 and 205.

It is possible, and often advisable, to separate the neighboring convolutions 266 from each other by layers or films or discrete sheets of a material which reduces or promotes friction between the neighboring lateral surfaces of the convolutions in the recess 272. The very configuration of the convolutions 266 is such that it promotes the development of elasticity in the circumferential direction of the respective annular portions 262; this ensures that the flywheels 202, 205 can carry out a certain limited amount of angular movement relative to each other (such angular movement is opposed by the convolutions 266) at least when the vehicle is coasting. However, the extent of such angular displacement of the flywheels 202, 205 relative to each other is small or even negligible in comparison with that which can be carried out against the opposition of the coil springs 259 forming part of the damper 217. As already mentioned above, the slip clutch 260 is installed to operate in series with the damper 217.

When the vehicle is called upon to pull a load, i.e., when the flywheel 202 transmits torque to the flywheel 205, the magnitude of the torque can be selected in such a way that it can actually rise to a value at which the damping action of the springs 259 is reduced to zero because the neighboring windings of such coil springs actually abut each other so that each coil spring acts as a solid body (as seen in the circumferential direction of the flywheels 202, 205 and in the direction of transmission of torque from the flywheel 202 to the flywheel 205).

The apparatus 201 also comprises an assembly (auxiliary torque transmitting unit) 237 which is effective when the combustion engine is idle to ensure that the engine can be started as a result of pushing the motor vehicle or as a result of causing the vehicle wheels to roll along a sloping road surface so that the flywheel 205 transmits torque to the flywheel 202 at least in part by way of the coil spring of the assembly 237. The latter can be identical with the assembly 37 in the apparatus 1 of FIG. 1.

The resilient element 261 which is shown in FIG. 7 has a single helical convolution 266, and this single convolution extends around the annular portion 262 along an arc well in excess of 180°. The resilient element 261 of FIG. 7 can be replaced by or used jointly with one or more resilient elements having two, three or even more (partial) convolutions. For example, the annular portion 262 can be of one piece with two (partial) convolutions (not shown) which are located at least substantially diametrically opposite each other and each of which can extend along an arc of up to 180°. The plural (partial) convolutions preferably extend in the same direction, i.e., all of the plural convolutions will extend in a clockwise or in a counterclockwise direction. If the annular portion 262 carries three identical (partial) convolutions, each such convolution can extend along an arc of up to 120°. The dimensions of the plural convolutions are or can be selected in such a way that they are stressed radially inwardly when the resilient elements having sets of two or more (partial) convolutions each are installed in the annular leg 274 of the shroud 273 in lieu of the resilient elements 261 of the type shown in FIGS. 6 and 7.

The convolutions 266 (or their non-illustrated equivalents) enable the slip clutch 260 to act as a freewheel (overrunning clutch) when the vehicle is coasting, as soon as the magnitude of the torque being transmitted from the flywheel 205 to the flywheel 202 rises to a predetermined value.

The antifriction bearing 226 between the flywheels 202, 205 is or can be identical with the bearing 3 or with the bearing 126.

The utilization of a slip clutch (such as 260) wherein the resilient elements (such as 261) are provided with relatively long convolutions (such as 266), particularly with convolutions extending along arcs of at least 90°, is especially desirable if the apparatus (such as 201) is to transmit pronounced torques when the vehicle is pulling a load. As already mentioned above, and particularly if each resilient element is provided with a single convolution, such single convolution can extend along an arc of between about 180° and about 540°. Results of tests indicate that the magnitude of transmitted torque is quite satisfactory if the convolutions extend along arcs of between about 400° and 500°, particularly about 450° (as actually shown in FIG. 7). Of course, if the arc exceeds 360° and the resilient elements are assembled in a manner as shown in FIG. 6, a portion of each convolution bears directly upon the internal surface of the leg 274 and the remaining portion of the convolution overlaps the radially inwardly adjacent portion of the same convolution.

The arc along which the resilient element(s) of the improved torsional vibrations damping apparatus extend can greatly exceed 180° or 450° or 500° if the resilient element or elements are coil springs of the type shown (at 18) in FIG. 1 and (at 118) in FIG. 5. Such springs can have numerous (e.g., seven or more) convolutions. Furthermore, and as described for example with reference to FIGS. 1 to 3, each spring (such as 18) can have several (such as two) end convolutions (19a) in frictional engagement with a first part (23) and several (e.g., two) end convolutions (19a) in frictional engagement with another part (33) so that the overall frictional engagement is taking place along a helical stretch of well over 1000°.

The provision of a damper, (such as 217) in series with the slip clutch 260 is particularly desirable and advantageous when the convolutions 266 of the resilient elements 261 are configured and installed in such a way that the extent to which the flywheels 202, 205 can turn relative to each other without any slippage between the leg 274 and the convolutions 266 is minimal or zero. It is also possible to mount the slip clutch 260 in series with two or more dampers 217 or to install a single damper 217 in series with two or more slip clutches 260 or analogous torsional vibrations damping devices. The coil springs 259 of the damper 217 can be arcuate springs which are bent or curved prior to installation in the windows 264, i.e., such coil springs can extend in the circumferential direction of the flywheel 202 and can have their centers of curvature on or at the axis 204. Alternatively, the axes of the coil springs 259 can be straight or substantially straight so that such axes extend at least substantially tangentially of that (radially inner) part of the section 258 of the primary flywheel 202 which is provided with holes or bores or windows for the shanks of the fasteners 230.

The damper 217 can be installed upstream (ahead) or downstream (behind) of the slip clutch 260, as seen in the direction of transmission of torque from the prime mover (such as the combustion engine of a motor vehicle) to the driven unit (such as the transmission in the power train between the engine and the front and/or rear wheels of the vehicle).

The illustrated damper 217 is constructed and installed to be effective at least when the primary flywheel 202 transmits torque to the secondary flywheel 205. It is possible (and often desirable) to employ a damper which constitutes a so-called idling damper or idling stage, e.g., a device known as idle stage damper with lock-up. Such dampers were proposed for use in certain types of vehicles to eliminate the so-called tip-in/tip-out clunk problems.

The ability of the slip clutch 260 to act as a freewheel or overrrunning clutch (at least when the vehicle is coasting), as soon as the magnitude of the torque being transmitted between the primary and secondary flywheels rises to a pre-selected value, is desirable and advantageous on the additional ground that this prevents the development of undesirable oscillation or resonance in the power train in response to an abrupt interruption of depression of the gas pedal, i.e., in response to a sudden transition from operation with pull to coasting.

It can be of particular advantage if the improved apparatus (such as 201) is designed to transmit a torque within the range of between about 50 and 200 Nm (especially between about 80 and 150 Nm) when the vehicle is coasting. The exact magnitude of such torque will depend upon a plurality of variables, for example, the type and size of the vehicle and the characteristics of the engine. It is further advisable to select the magnitude of the torque which is to be transmitted during coasting of the vehicle in such a way that it renders it possible to start the engine by pushing the vehicle or by causing the vehicle wheels to roll along a sloping road surface. If such a torque cannot be achieved due to the development of undesirable vibrations and/or other stray movements, one can resort to an auxiliary torque transmitting device, such as the assembly 37 in the apparatus 1 of FIG. 1 or the assembly 237 in the apparatus 201 of FIG. 6.

Figure 8:
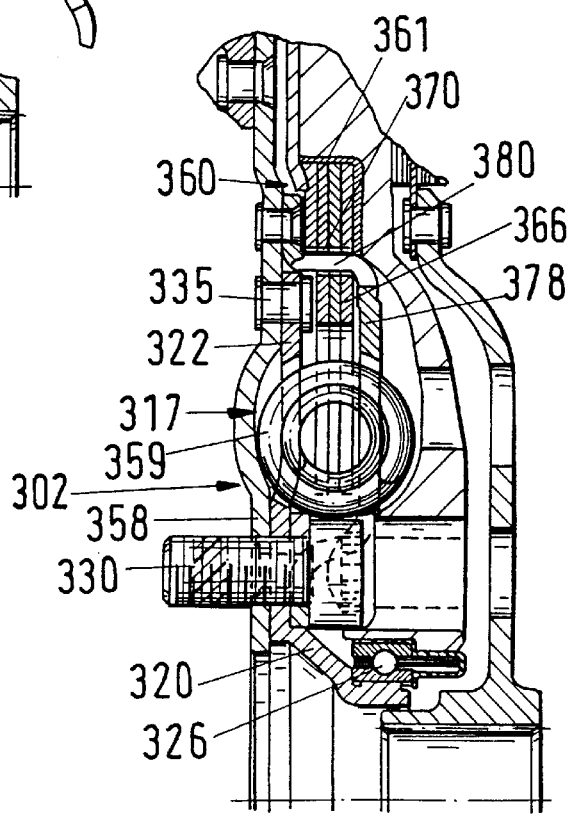
FIG. 8 is a fragmentary axial sectional view of an apparatus constituting a modification of the apparatus which is shown in FIG. 6.

The construction and mode of operation of the apparatus which is shown in FIG. 8 are similar to those of the apparatus 201 of FIGS. 6 and 7. An important difference between the two apparatus is that the component 320, which has a radially innermost portion constituting a carrier or support for the inner race of the antifriction bearing 326, includes a substantially disc-shaped portion 322 extending radially outwardly beyond the fasteners 330 (only one shown) and serving to bias the coil springs 359 (only one shown) of the damper 317. To this end, the portion 322 is provided with an annulus of windows each of which receives a portion of a discrete coil spring 359. The portion 322 of the component 320 is secured to the radially extending section 358 of the primary flywheel 302 by a set of rivets 335 (only one shown) which are located radially outwardly of the damper 317. The function of the section 358 is the same as or clearly analogous to that of the section 258 of the primary flywheel 202 in the apparatus 201 of FIG. 6.

A disc-shaped member 378 in the apparatus of FIG. 8 corresponds to the member 278 of the apparatus 201 and includes a radially outer portion provided with axially parallel arms 380 extending into clearances or gaps 370 of the disc-shaped resilient elements 361 of a slip clutch 360. The arms 380 are fixedly secured to the section 358 of the primary flywheel 302. At least one of the arms 380 is arranged to abut the root portion of the convolution of at least one of the resilient elements 361 when the vehicle embodying the apparatus of FIG. 8 is coasting. With reference to FIG. 7, and assuming that the resilient elements 361 are identical with the resilient elements 261, this means that one of the arms 380 will extend into the gap 270 and will strike the junction 267 at the root portion 269 of one of the convolutions 266 during a certain stage of coasting of the vehicle. When at least one of the arms 380 engages the junction for the root portion of the convolution 366 of one of the resilient elements 361, the respective resilient element 361 is form-lockingly connected with and shares the angular movements of the primary flywheel 302 (whose section 358 is fixedly connected to the member 378 by rivets one of which is shown in FIG. 8 above the rivet 335).

It will be seen that the asymmetrically acting slip clutch 360 is installed downstream of (i.e., behind) the damper 317, as seen in the direction of the transmission of torque from the engine, via primary flywheel 302, and to the secondary flyweel. The same applies for the damper 217 and the slip clutch 260 in the apparatus 201 of FIG. 6.

The apparatus (composite flywheel) 401 of FIG. 9 is constructed in such a way that the slip clutch 460 (including three resilient elements 461) is installed ahead (upstream) of the damper 417, as seen in the direction of the transmission of torque from the prime mover (such as the combustion engine of a motor vehicle), through the primary flywheel 402 and to a driven unit (such as a transmission in the power train of the motor vehicle) by way of a secondary flywheel 405 and a friction clutch (the latter is or can be identical with the friction clutch 6 in the apparatus 1 of FIG. 1). Thus, the slip clutch 460 is mounted on the primary flywheel 402.

The resilient elements 461 of the slip clutch 460 are similar to the resilient elements 261 of the slip clutch 260 but are devoid of radially inwardly extending arms (such as the arms 263 shown in FIG. 7); these resilient elements 461 are adjacent to each other in parallel planes normal to the common axis of the flywheels 402 and 405 and the antifriction bearing 426. The annular portions (see the annular portion 262 of the resilient element 261 shown in FIG. 7) of the resilient elements 461 are provided with openings for the shanks of rivets or for other suitable fasteners which nonrotatably secure the resilient elements 461 to a flange-like input member 422 of the damper 417.

Figure 13:
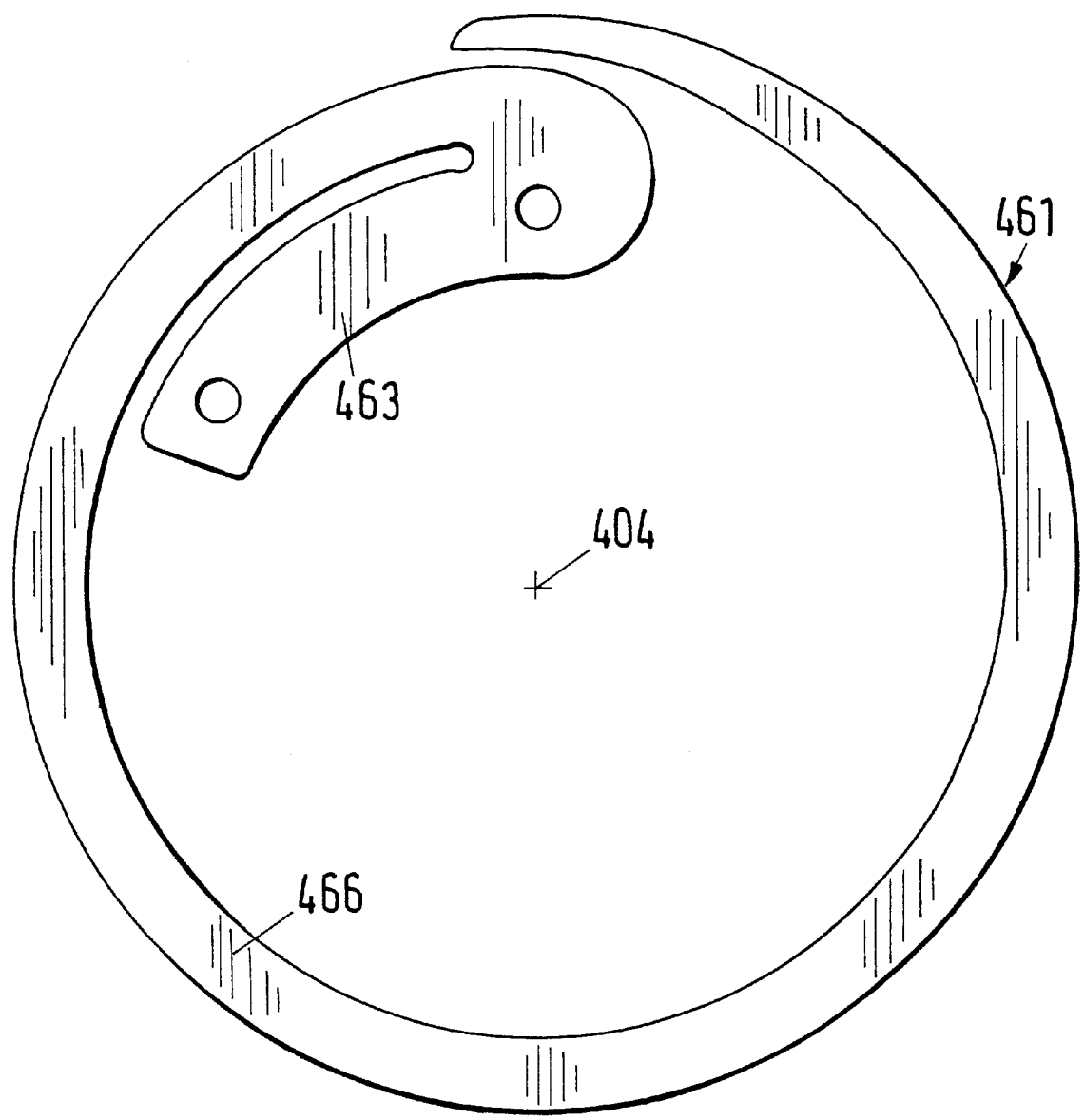
FIG. 13 is a front elevational view of a resilient element which can be utilized, for example, in the apparatus of FIG. 9.

It is also possible to construct and to configurate each of the resilient elements 461 in a manner as shown in FIG. 13. The resilient element 461 of FIG. 13 comprises (actually constitutes) a convolution 466 having a root portion 463 which is affixed to the input member 422 of the damper 417 by rivets or the like. The dimensions of the root portions 463 (as seen in the circumferential direction of the flywheels 402 and 405) are selected in such a way that two or more such root portions can be placed next to each other in a common plane, i.e., that the respective convolutions 466 are staggered relative to each other in the circumferential direction of the flywheels 402 and 405 and must be located in different (parallel) planes if the root portions 263 are located in a common plane.

The slip clutch 460 of FIG. 9 comprises three resilient elements 461 of the type shown in FIG. 13. The root portions 463 of all three resilient elements 461 are disposed in a common (first) plane, namely in a plane which further includes the convolution 466 of the centrally located resilient element 461. The convolution 466 of a second resilient element 461 is located in a second plane at one side of the first plane, and the convolution of the third resilient element 461 is located in a third plane at the other side of the first plane. The root portions 463 of all three resilient elements 461 of the slip clutch 460 are disposed in the first or central plane and are preferably equidistant from each other in the circumferential direction of the flywheels 402 and 405. Such uniform distribution of the root portions 463 ensures that the three resilient elements 461 counterbalance each other when the slip clutch 460 is caused to rotate about the axis 404. The root portion 463 and the convolution 466 of the median resilient element 461 are located in a common plane (i.e., in the aforementioned central or first plane) but the root portion 463 and the convolution 466 of each of the other two resilient elements 461 are not coplanar, i.e., their root portions 463 are located in the first or central plane but their convolutions 466 are located in two additional (second and third) planes flanking the first or central plane.

The means for connecting the root portions 463 of all three resilient elements 461 to the flange-like input member 422 of the damper 417 includes the rivets 435 (one shown in FIG. 9). The extent of flexing of the two outer resilient elements 461 in the regions between their root portions 463 and the respective convolutions 466 is small or negligible because the resilient elements 461 are (or can be) very thin.

The convolutions 466 are stressed radially inwardly by the internal surface of the annular portion 474 of a sheet-metal part or shroud 476 which is connected to the (sheet-metal) section 458 of the primary flywheel 402. The section 458 serves to connect (by means of fasteners 430) the primary flywheel 402 of the apparatus 401 to the output shaft of a prime mover (e.g., to the camshaft or crankshaft of a combustion engine). The radially outer portion of the section 458 is riveted to the previously discussed bulkier sheet-metal section 457 of the primary flywheel 402, and the section 457 carries the customary starter gear. The section 457 is made up of several layers of suitably deformed metallic sheet material.

The coil springs 459 of the damper 417 are deformable in the circumferential direction of the flywheel 402 when this flywheel and the secondary flywheel 405 (and hence the input member 422 and the resilient elements 461) are caused to turn relative to each other. The secondary flywheel 405 is rigid with two disc-shaped members 478, 479 which flank the input member 422 and have windows for portions of the coil springs 459; such windows are in at least partial alignment with windows provided in the input member 422 and also receiving portions of the coil springs 459.

The outer race of the bearing 426 is surrounded by an annular portion of the secondary flywheel 405 or of a part which is fixedly secured to the secondary flywheel.

The feature that the root portions 463 of all three resilient elements 461 are disposed in a common (first or central) plane but that the convolutions 466 of these three resilient elements are located in three neighboring planes ensures that the convolutions 466 bear against each other (i.e., the two outer convolutions 466 bear against the respective sides of the convolution 466 in the first plane). This counteracts the tendency of the resilient elements 461 to assume frustoconical shapes (such as that of a diaphragm spring) and ensures the establishment of a more predictable and more stable frictional engagement between the convolutions 466 and the annular portion 474. The tendency of the resilient elements 461 to tilt or buckle is also counteracted by the substantially radially extending portion 476*a* of the sheet-metal part or shroud 476. The portion 476*a* cooperates with the section 458 of the primary flywheel 402 to define a radially extending narrow pocket or slot for the convolutions 466 of the three resilient elements 461.

The parts 458 and 476*a* cooperate to ensure that the convolutions 466 of the three resilient elements 461 are biased against each other in the direction of the axis 404 to thus establish a basic friction torque for the slip clutch 460. Reference may be had to the function of the elastic element 276 in the apparatus 201 of FIG. 6.

FIG. 10 illustrates a portion of an apparatus 501 wherein the convolutions 566 of the resilient elements 561 forming part of the slip clutch 560 are staggered relative to each other in the circumferential direction of the primary flywheel 502 and the secondary flywheel 505. The convolutions 566 are biased against each other in the direction of the common axis of the flywheels 502 and 505. The resilient elements 561 are or can be identical with the resilient element 461 of FIG. 13, i.e., their root portions 563 are disposed in a common plane and are staggered relative to each other in the circumferential direction of the flywheels 502 and 505. The convolutions 566 are urged against each other and against a radially extending portion or abutment 584 of a flange-like output member 522 of the damper 517 due to their resiliency and due to their deformation, i.e., the convolutions 566 are not positively biased against the abutment 584 by a spring (such as the elastic element 276 of FIG. 6) or the like. The abutment 584 has an internal shoulder 574 surrounding the convolutions 566.

The damper 517 is installed ahead (upstream) of the slip clutch 560, as seen in the direction of transmission of torque from the engine to the primary flywheel 502, to the secondary flywheel 505 and, by way of the friction clutch 506, to the transmission (via clutch disc 510). The coil springs 559 of the damper 517 can be stressed by the radially outwardly extending arms, projections or lugs 522a of the output member 522 which rotates with the secondary flywheel 505, and by suitably configured pockets or depressions forming part of the primary flywheel 502 when the flywheels 502 and 505 are caused to turn relative to each other about their common axis.

FIG. 10 further shows an annular chamber 581 which is defined by two sheet-metal sections 557, 558 of the primary flywheel 502 and which is at least partially filled with a supply of preferably highly viscous (such as pasty) lubricating material for the helices of the coil springs 559. Those parts of the sections 557, 558 of the primary flywheel 502 which are adjacent the coil springs 559 have configurations which ensure that the springs 559 are properly guided and confined in the annular chamber 581 so that they can expand or contract in the circumferential direction of the flywheel 502 when the sections 557, 558 and the output member 522 are caused to turn relative to each other.

The radially inner portion of the section 558 of the primary flywheel 502 serves to secure the primary flywheel to the rotary output member of a prime mover.

The projections 522a of the output member 522 extend radially outwardly into the chamber 581 and between the neighboring coil springs 559 of the damper 517. Rivets 535 are provided to secure the root portions 563 of the resilient elements 561 of the slip clutch 560 to the secondary flywheel 505. As already mentioned above, the convolutions 566 of the resilient elements 561 bear against the radially extending median portion or abutment or shoulder 584 of the output member 522 of the damper 517.

The friction clutch 506 is mounted on the secondary flywheel 505. This friction clutch includes a counterpressure plate 508 (which is actually part of the secondary flywheel 505) and a pressure plate 507 which is biased by the clutch spring or diaphragm spring 513 when the clutch 506 is engaged so that the plates 507, 508 compel the friction linings of the clutch disc 510 to rotate with the secondary flywheel 505.

The apparatus 501 of FIG. 10 further comprises a hysteresis arrangement 582 which is actually a torque limiting device and operates in parallel with the damper 517 as well as with the slip clutch 560.

The radially inner portions of the flywheels 502 and 505 are adjacent the respective races of an antifriction bearing 526.

The locations 583 where the root portions 563 of the resilient elements 561 are fastened to the counterpressure plate 508 (i.e., to the secondary flywheel 505) are distributed in such a way that the resilient elements 561 are stressed in the direction of the common axis of the flywheels 502 and 505; this ensures that the annular radially inner portion 584 of the flange-like output member 522 of the damper 517 is clamped axially between the elastically deformable convolutions 566 of the resilient elements 561 and a radially extending portion 585 of the counterpressure plate 508. This entails the generation of additional friction torque which remains effective at least when the vehicle embodying the apparatus 501 is coasting and after the clutch 560 is already compelled to slip. Moreover, such mounting of the radially inner portion 584 of the output member 522 ensures that the portion 522a is maintained in a predetermined axial position. This is desirable because such predetermined positioning of the portion 522a ensures the establishment of a predictable sealing action at the radially inner region of the chamber 581; such sealing action is furnished by preferably resilient sealing elements 586, 587 which operate between the portion 522a one the hand and the sections 558 and 557 on the other hand.

The apparatus of FIG. 11 comprises a slip clutch 660 having a single disc-shaped resilient element 661 which is a helix and is installed in a radially deformed condition to act as an oscillatory rocker. A damper 617 is installed between the flywheels 602 and 605 in a manner analogous to that already described with reference to the damper 517 of FIG. 10; this damper 617 operates in series with the slip clutch 660 including the resilient element 661. The slip clutch 660 is designed to limit the magnitude of the torque which can be transmitted between the flywheels 602 and 605, at least when the vehicle is coasting, i.e., when the secondary flywheel 605 transmits torque to the primary flywheel 602. The single resilient element 661 of the slip clutch 660 is or can be a functional equivalent of and can resemble one of the resilient elements 261 shown in FIG. 6.

Referring to FIG. 12, there is shown a portion of an apparatus 701 having primary and secondary flywheels 702, 705 which are rotatable (with and relative to each other) about a common axis 704. The convolution 766 of a slip clutch 760 is of one piece with a flange-like part 722 which is the input member of the damper 717. The latter operates between the flywheels 702 and 705 in a manner similar to that of the damper 417 which is shown in FIG. 9. The convolution 766 is stressed in the radial direction of the flywheels 702, 705 and its radially outer portion includes axially parallel projections or lugs 766a which act upon the adjacent internal surface of the primary flywheel 702 with a force increasing in response to increasing RPM of the flywheel 702, namely in response to an increase of the centrifugal force which acts upon the projections 766a and tends to move or flex them radially outwardly against the flywheel 702. Thus, the torque transmitting action of the slip clutch 760 increases proportionally with the increasing RPM of the input member 722.

The apparatus 801 of FIG. 14 constitutes a further modification of the apparatus 1 which is shown in FIG. 1. A difference between the apparatus 1 and 801 is that the combined torsional vibrations damping and torque limiting means 817 operating between the primary and secondary flywheels 802 and 805 of FIG. 14 includes a composite spring 818 which comprises two helically wound radially deformable springs 818a and 818b. The springs 818a, 818b have neighboring inner end convolutions which are non-rotatably connected to each other. As shown in FIG. 14, the connection between the inner end convolutions of the springs 818a, 818b can comprise one or more rivets 880.

The free (left-hand) end convolution(s) 819a of the left-hand spring 818a abuts or abut the internal surface of the annular radially outer portion 823 of a component 820 which is affixed to the primary flywheel 802 by fasteners 830 (only one shown in FIG. 14). The free (right-hand) end convolution(s) 819*a* of the right-hand spring 818*b* abuts or abut the internal surface of an annular portion 833 forming part of a component 821 which is riveted to the secondary flywheel 805.

The mounting of the springs 818*a*, 818*b* is such that they act in opposite directions as considered circumferentially of the flywheels 802 and 805 which are rotatable with and relative to each other about a common axis 804. To this end, the convolutions of the spring 818*b* extend from the end convolution(s) 819*a* toward the connection 880 in the direction of rotation of the flywheel 802 in response to transmission of torque from the engine. On the other hand, and starting from the connection 880 and proceeding toward the end convolution(s) 819*a* of the spring 818*a*, the convolutions of this spring extend in a direction counter to that of the convolutions of the spring 818*b*. Such mounting of the springs 818*a* and 818*b* ensures that the spring 818*a* contributes to an increase of the magnitude of the torque which can be transmitted from the primary flywheel 802 to the secondary flywheel 805 when the vehicle is pulling a load because the convolutions of the spring 818*a* then tend to move radially outwardly. At the same time, the torque which can be transmitted by the spring 818*b* decreases because the convolutions of this spring are being acted upon by forces which tend to reduce their diameters. Thus, the spring 818*a* cooperates with the annular portion 823 in the same way as the spring 1 in the apparatus 1 of FIG. 1 cooperates with the annular portion 23. Furthermore, the intermediate or median convolution(s) of the spring 818*a* acts or act as a resilient coupling or connector between the flywheels 802 and 805.

The spring 818*b* is biased radially against the internal surface of the annular portion 833 in such a way that, when the vehicle is pulling a load, the composite spring 818 can transmit a predetermined maximum torque before the end convolution(s) of the spring 818*b* begins or begin to slip relative to the annular portion 833. Such maximum torque should exceed the maximum torque which the engine can transmit to the primary flywheel 802. For example, the maximum torque which the spring 818 can transmit from the flywheel 802 to flywheel 805 is or can be between 1.5 and 3 times the nominal torque which the engine can transmit to the flywheel 802.

FIG. 15 shows a portion of an apparatus 901 comprising a damper 917 which performs the additional function of limiting the magnitude of the torque being transmitted at least when the vehicle is coasting, i.e., when the secondary flywheel 905 drives the primary flywheel 902. The damper 917 is analogous to the damper 17 in the apparatus 1 of FIG. 1.

The apparatus 901 further comprises a hysteresis unit or assembly 947 having a friction ring 948 which is clamped (as seen in the direction of the common axis of the flywheels 902 and 905) between a radially extending portion 951 of a sheet-metal part 952 fixedly secured to the primary flywheel 902, and a disc or washer 953 which is biased by a diaphragm spring 954 for the unit 947. A sleeve-like member 955 includes a left-hand end portion which is connected to and can rotate with the friction ring 948, and a right-hand end portion rotatable with the right-hand end convolution 919*a* of the spring 918. A form-locking connection 956 is provided between the right-hand end convolution 919*a* and the sleeve-like member 955.

When the flywheels 902 and 905 are caused to turn relative to each other, the spring 918 acts in the same manner as the spring 18 in the apparatus 1 of FIG. 1. Thus, the spring 918 yieldably opposes the angular movements of the flywheels 902 and 905 relative to each other, and such resistance or opposition is superimposed upon the friction which is generated by the hysteresis unit 947.

The form-locking connection 956 can be designed in such a way that it permits a certain angular displacement between the spring 918 and the member 955. This enables the hysteresis unit 947 to generate a so-called delayed friction. Thus, when the direction of rotation of the flywheels 902, 905 relative to each other is reversed, no friction is generated by the hysteresis unit 947 during a certain initial stage of angular displacement of the flywheels 902 and 905 relative to each other.

Figure 16:
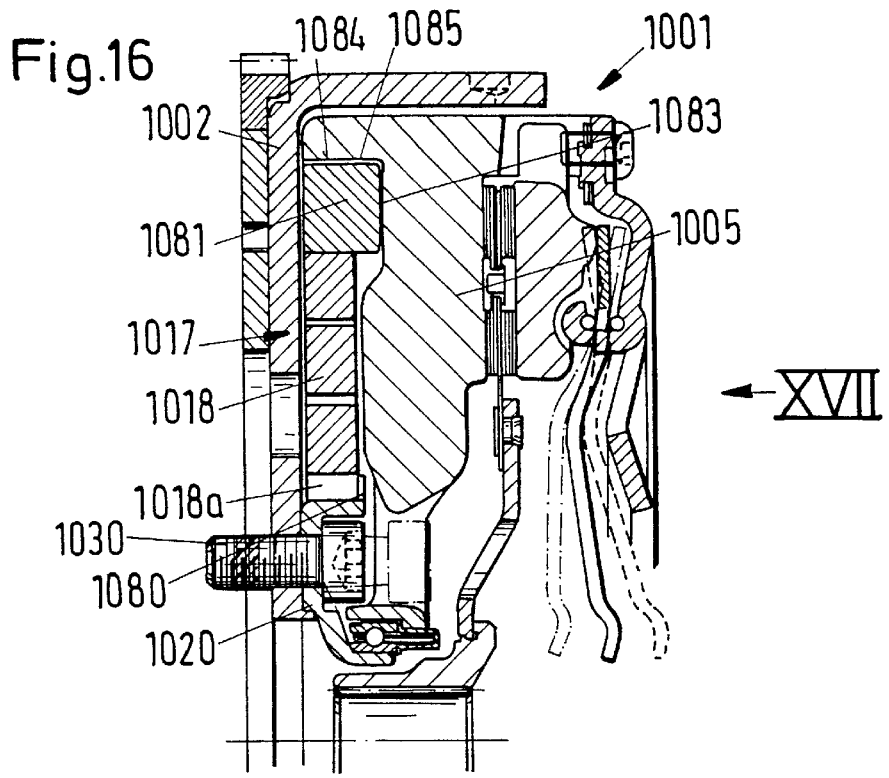
FIG. 16 is a fragmentary axial sectional view of still another torque transmitting and torsional vibrations damping apparatus.
Figure 17:
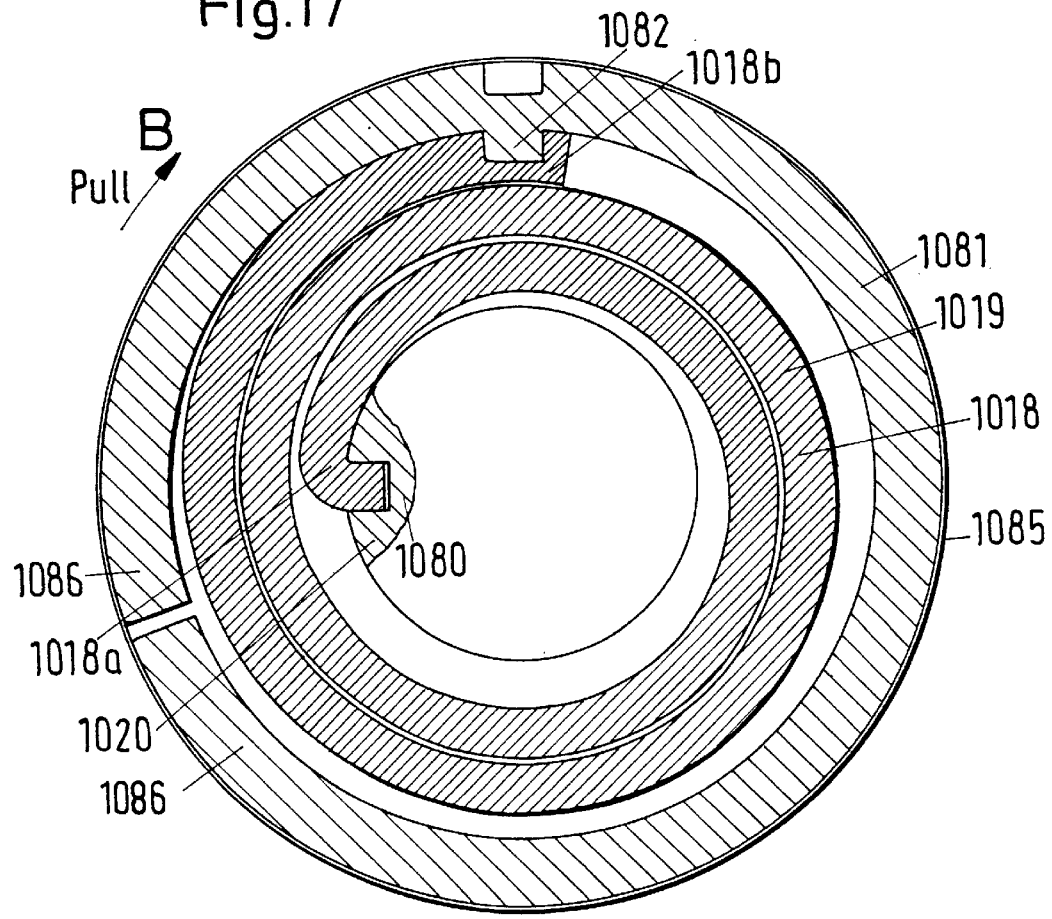
FIG. 17 is a smaller-scale elevational view of certain parts of the torque transmitting and torsional vibrations damping apparatus substantially as seen in the direction of arrow XVII in FIG. 16, with an annular portion of the apparatus shown in a sectional view.

Referring to FIGS. 16 and 17, there is shown an apparatus (composite flywheel) 1001 including primary and secondary flywheels 1002, 1005 and a damper 1017 having a helically convoluted torsion spring 1018. This spring is obtained by winding a wire having a polygonal (square or rectangular) cross-sectional outline. The radially inner end portion 1018*a* of the spring 1018 is non-rotatably secured to the primary flywheel 1002; to this end (and as best seen in FIG. 17), the end portion 1018*a* is bent radially inwardy toward the common axis of the flywheels 1002, 1005 and extends into a complementary radial recess or socket 1080 of an annular component 1020 which is affixed to the primary flywheel 1002 by fasteners 1030 which further serve to secure the primary flywheel 1002 to the rotary output shaft of a combustion engine. The radially outer end portion 1018*b* of the spring 1018 is secured to an annular part 1081 which is a component of a slip clutch or torque limiting clutch and is non-rotatably carried by the secondary flywheel 1005. The means for securing the part 1081 to the secondary flywheel 1005 includes a form-locking connection 1082. The part 1081 is a resilient split ring having end portions 1086 flanking a radial slot. The connection 1082 includes a radially inwardly extending protuberance which is provided on the part 1081 and extends into a complementary socket or recess in the radially outer end portion 1018*b* of the spring 1018. The part (split ring) 1081 is received in an annular recess 1083 which is provided in the secondary flywheel 1005 and is bounded by a cylindrical surface 1084.

The external surface of the prestressed split ring 1081 bears against the internal surface 1084, i.e., the outer diameter of the split ring 1081 is greater when this part is free to expand into engagement with the cylindrical internal surface 1084 of the secondary flywheel 1005. The split ring 1081 can be configured in such a way that, when not stressed, it tends to assume a non-circular outline (i.e., to assume a shape which departs from a truly circular shape); this renders it possible to compensate for internal stresses in longitudinally spaced-apart portions of the split ring 1081.

In the apparatus 1001 of FIGS. 16 and 17, the cross-sectional area of the split ring 1081 is constant from one of its end portions 1086 all the way to the other end portion. However, it is also possible to employ a split ring having a cross-section which varies from section to section or only within one or more selected sections (as seen longitudinally of the split ring) in order to ensure a predetermined distribution and/or development of stresses when the apparatus 1001 is in actual use.

The magnitude of the torque which can be transmitted between the split ring 1081 and the secondary flywheel 1005 is determined by the characteristics of a layer or film or coat (hereinafter called coat) 1085 which is applied to the peripheral surface of the split ring 1081 to contact the internal surface 1084 of the secondary flywheel 1005. The coat 1085 can consist of or contain a friction enhancing or a friction reducing material and can be applied by spraying or by bonding a layer of friction-influencing material to the split ring 1081. It is clear that the coat 1085 can be applied to the internal surface 1084 or that one can employ two coats (having identical or different friction influencing or modifying characteristics) one of which is applied to the internal surface 1084 of the secondary flywheel 1005 and the other of which is applied to the peripheral surface of the split ring 1081.

When the flywheels 1002 and 1005 are caused to rotate, centrifugal force acts upon the split ring 1081 and urges its coat 1085 against the internal surface 1084 of the secondary flywheel 1005 with a force which increases in response to increasing RPM of the flywheels. The radial prestressing of the split ring 1081 and the action of the form-locking connection 1082 is or can be selected in such a way that, when the primary flywheel 1002 is driven by the engine of a motor vehicle, i.e., when the vehicle pulls a load, the entire torque which is being transmitted by the engine to the flywheel 1002 can be transmitted to the secondary flywheel 1005. When the vehicle is coasting (i.e., when the engine acts as a brake), the split ring 1081 permits the secondary flywheel 1005 to turn relative to the primary flywheel 1002 when the magnitude of the torque being transmitted by way of the damper 1017 rises to a predetermined value, namely a value which is less than the nominal torque of the engine.

The magnitude of the torque which the split ring 1081 can transmit between the primary and secondary flywheels 1002, 1005 during pulling of a load by or during coasting of the vehicle depends upon the position of the form-locking connection 1082 relative to the radial slot between the end portions 1086 of the part 1081. The arrow B (shown in FIG. 17) indicates the direction of rotation of the primary flywheel 1002 when the engine is on and the vehicle pulls a load; the end portions 1086 are spaced apart from the form-locking connection 1082 as seen counter to the direction which is indicated by the arrow B. If the end portions 1086 are nearer to the form-locking connection 1082 (as seen in the direction of the arrow B), the ability of the split ring 1081 to transmit torque from the flywheel 1002 to the flywheel 1005 (i.e., when the vehicle is in the process of pulling a load) increases but the magnitude of the torque which can be transmitted from the flywheel 1005 to the flywheel 1002 (while the vehicle is coasting) decreases.

The reason for the just described possibility of influencing the magnitude of the torque being transmitted between the flywheels 1002 and 1005 when the vehicle is pulling a load or is coasting is that, when the end portions 1086 are located nearer to the connection 1082 (as seen in the direction of the arrow B), the length of the arcuate zone of frictional engagement between the split ring 1081 and the internal surface 1084 of the secondary flywheel 1005 increases accordingly i.e., the area of friction-transmitting contact between the coat 1085 and the internal surface 1084 is increased. If the end portions 1086 are moved (clockwise, as viewed in FIG. 17) next to the connection 1082, the area of frictional engagement between the internal surface 1084 and the coat 1085 is close to 360°. On the other hand, the area of effective frictional engagement between the internal surface 1084 and the coat 1085 is then zero or close to zero if the vehicle is coasting.

It will be seen that the function of the split ring 1081 is clearly analogous to that of the end convolutions 19a of the spring 18 in the apparatus 1 of FIG. 1. The helical spring 1018 establishes a yieldable connection between the flywheels 1002 and 1005, i.e., the function of this spring 1018 is analogous to that of the median or intermediate convolutions 19b of the spring 18.

When the engine drives the primary flywheel 1002, the spring 1018 receives torque by way of its radially inner end portion 1018a. As can be seen in FIG. 17, the convolutions 1019 of the spring 1018 then tend to increase their diameters, i.e., the radially outermost convolution 1019 bears upon the internal surface of the split ring 1081 and urges the coat 1085 against the internal surface 1084 of the secondary flywheel 1005 with a greater force which reduces the tendency of the split ring 1081 and of the secondary flywheel 1005 to slip relative to each other.

An advantage of the apparatus 1001 of FIGS. 16 and 17 is that the wear upon the spring 1018 as a result of friction is practically nil and, consequently, the thermal stressing of the split ring 1081 and/or of the coat 1085 and/or of that portion of the secondary flywheel 1005 which is adjacent the internal surface 1084 is also nil or at least close to zero (because the angular displacement between the internal surface of the split ring 1081 and the adjacent outermost convolution 1019 of the spring 1018—as well as between the coat 1085 and the internal surface 1084—is minimal or zero).

Figure 18:
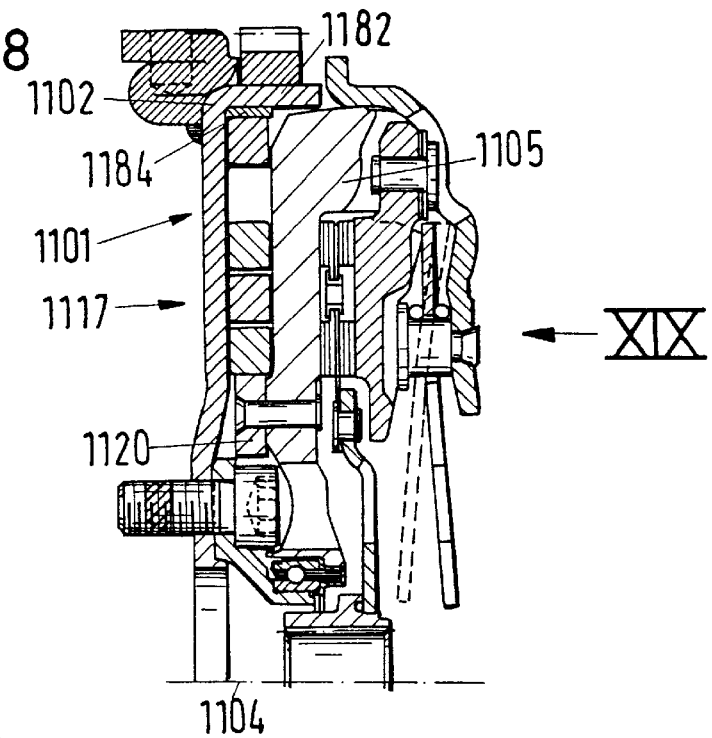
FIG. 18 is a view similar to that of FIG. 16 but showing a portion of a further apparatus.
Figure 19:
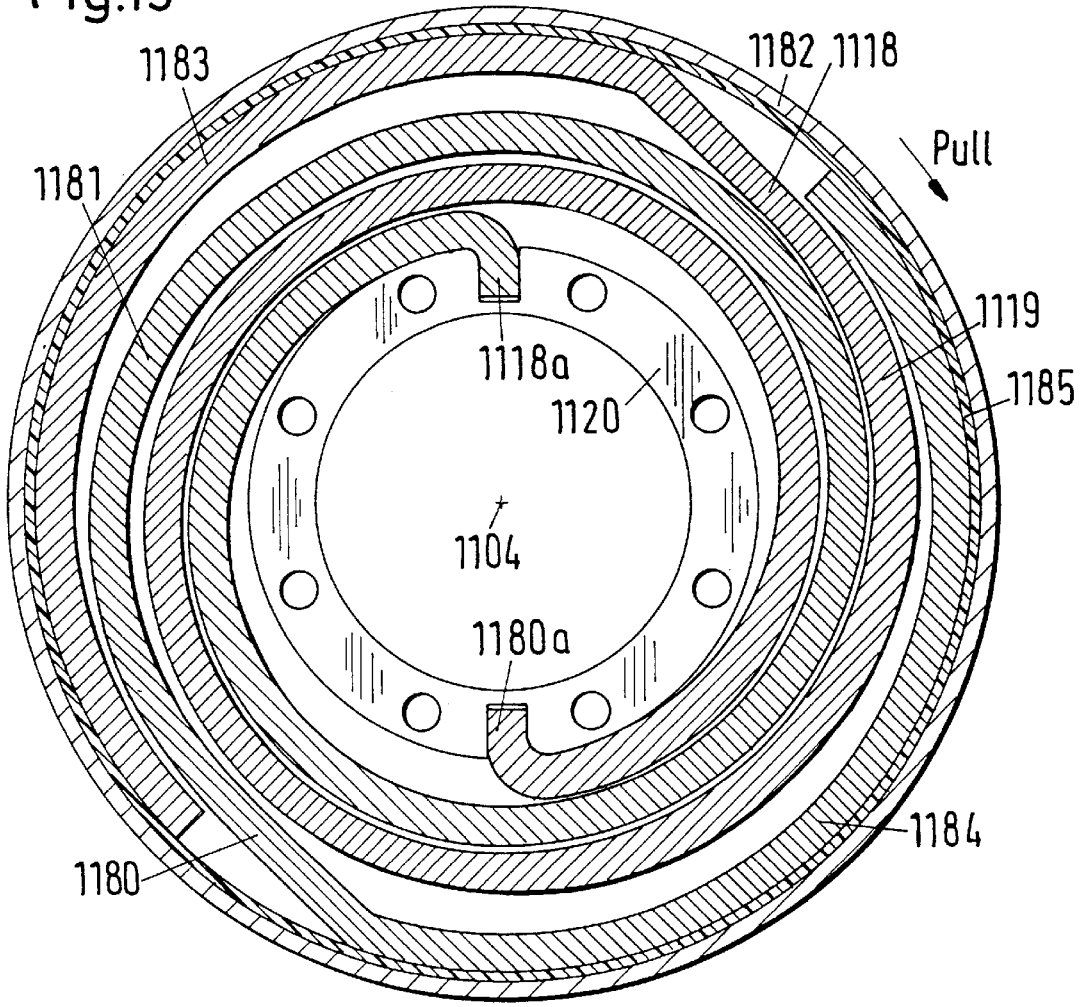
FIG. 19 is an elevational view substantially as seen in the direction of arrow XIX in FIG. 18 but showing a portion of the input member of the apparatus in a sectional view.

Referring finally to FIGS. 18 and 19, there is shown an apparatus 1101 having a primary flywheel 1102, a secondary flywheel 1105, which latter can rotate with as well as relative to the primary flywheel 1102 about a common axis 1104, and a damper 1117 which serves to at least reduce the transmission of torsional vibrations between the flywheels 1102 and 1105 and which further serves as a means for limiting the magnitude of the torque which can be transmitted between the two flywheels.

The damper 1117 comprises two helical springs 1118 and 1180 having radially inner end portions 1118a, 1180a which are non-rotatably affixed to a component 1120 carried by the secondary flywheel 1105. The springs 1118, 1180 are similar to or identical with each other but are angularly offset relative to one another through 180° (as seen in the circumferential direction of the flywheels 1102 and 1105). This ensures that the two springs 1118, 1180 counterbalance or neutralize each other when the flywheels 1102 and 1105 are caused to rotate.

The convolutions 1119 and 1181 of the springs 1118, 1180 are fitted into each other (i.e., they are located in a common plane which is normal to the axis 1104), and each of these springs is installed in an axially extending annular portion 1182 of the primary flywheel 1102 in a radially prestressed condition. The radially outermost portions 1183, 1184 of the respective helical springs 1118, 1180 indirectly bear against the cylindrical internal surface of the portion 1182 by way of a friction influencing layer, film or coat 1185. The coat 1185 (which can enhance or reduce friction) is optional, i.e., the radially outermost portions 1183, 1184 of the springs 1118, 1180 can bear directly against the annular portion 1182 of the primary flywheel 1102.

The configuration of the end portions 1183, 1184 and the stressing of the springs 1118, 1180 are such that, when these springs store energy, they are in large-area or larger-area contact with the coat 1185 or directly with the portion 1182 of the primary flywheel 1102.

Since the springs 1118, 1180 are in (direct or indirect) frictional engagement with the portion 1182 of the primary flywheel 1102, the directions in which the convolutions 1119, 1181 of these springs (starting from their radially innermost portions 1118a, 1180a) extend is counter to that of the convolutions 1019 of the spring 1018 in the apparatus 1001 of FIG. 16. The reason is that the spring 1018 is in frictional engagement with the secondary flywheel 1005 of the apparatus 1001.

When the vehicle embodying the apparatus 1101 of FIGS. 18 and 19 is in the process of pulling a load (i.e., when the combustion engine of such vehicle transmits torque to the primary flywheel 1102), the helical springs 1118, 1180 act in a sense to increase the magnitude of the torque which can be transmitted from the primary flywheel 1102 to the secondary flywheel 1105. This is due to the fact that the convolutions 1119, 1181 of the respective springs 1118, 1180 then tend to increase their diameters an to thus exert a greater force upon the friction-influencing coat 1185 at the internal surface of the annular portion 1182 of the primary flywheel 1102. When the vehicle is coasting so that the engine acts as a brake, the helical springs 1118 and 1180 act as a freewheel or overrunning clutch and begin to slip relative to the coat 1085 and the primary flywheel 1102 when the magnitude of the torque being transmitted from the secondary flywheel 1105 to the primary flywheel 1102 rises to a preselected value. The exact magnitude of such torque (i.e., the preselected value) is dependent upon the radial stressing of the springs 1118 and 1180 as well as upon the magnitude of centrifugal force acting upon the convolutions 1119, 1181 while the vehicle is coasting.

In certain embodiments of the improved apparatus, the radially stressed convolution or convolutions of the spring or springs can be mounted in such a way that the convolution or convolutions is or are guided by a sleeve-like or by a mandrel-shaped part (not specifically shown in the drawings).

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of transmitting torque between rotary input and output members and, therefore, such adaptations should and are intended to be comprehended within the meaning and range of equivalence of the appended claims.

What is claimed is:

1. Apparatus for damping torsional vibrations, comprising an input member connectable with a rotary part of a prime mover and rotatable about a predetermined axis; an output member coaxial with and rotatable relative to said input member and connectable with a rotary part of a driven unit; and means for transmitting torque between and for opposing rotation of said input and output members relative to each other, comprising a preassembled unit operating between said prime mover and said driven unit and having at least one elongated resilient element extending around said axis and including portions bendable at least radially of said axis and being normally stressed radially of said axis to thus tend to expand radially outwardly and thereby establish a frictional engagement between said at least one resilient element and an annular internal surface of at least one of said input and output members.

2. The apparatus of claim 1, wherein said prime mover is an engine and said driven unit includes a rotary shaft.

3. The apparatus of claim 1, further comprising means for form-lockingly connecting said at least one resilient element with the other of said input and output members.

4. The apparatus of claim 1, wherein said at least one resilient element includes a first portion in frictional engagement with said input member and a second portion in frictional engagement with said output member.

5. The apparatus of claim 1, wherein at least a portion of said at least one resilient element is a spiral.

6. The apparatus of claim 1, wherein said at least one resilient element is a coil spring which is at least substantially coaxial with said input and output members.

7. The apparatus of claim 1 wherein said at least one resilient element includes a torsion spring.

8. The apparatus of claim 1, wherein said torque transmitting means comprises a plurality of resilient elements which are offset relative to each other in a circumferential direction of said input and output members so that said resilient elements counterbalance each other when said input an output members rotate about said axis.

9. The apparatus of claim 1, wherein said torque transmitting means further comprises an annular primary portion and said at least one elongated resilient element extends around said axis from said primary portion.

10. The apparatus of claim 1, wherein said at least one resilient element extends around said axis along an arc of at least 90°.

11. The apparatus of claim 10, wherein said arc is between about 180° and 540°.

12. The apparatus of claim 10, wherein said arc is between about 400° and 500°.

13. The apparatus of claim 12, wherein said arc is about 450°.

14. The apparatus of claim 1, wherein said surface is a substantially cylindrical surface.

15. The apparatus of claim 1, wherein said input and output members and said torque transmitting means form part of a composite flywheel.

16. The apparatus of claim 15, wherein said input member comprises a first flywheel which is connectable with said rotary part of the prime mover and said output member comprises a second flywheel connectable with said rotary part of the driven unit by way of a friction clutch.

17. The apparatus of claim 16, wherein said driven unit includes a transmission of a motor vehicle.

18. The apparatus of claim 16, further comprising a bearing interposed between said input and output members.

19. The apparatus of claim 1, wherein said torque transmitting means is arranged to transmit torque at least from said input member to said output member and said frictional engagement increases as a result of rotation of said output member in response to rotation of said input member by the prime mover but decreases as a result of rotation of said output member by at least one device other than said prime mover.

20. The apparatus of claim 19, wherein said prime mover is an engine of a motor vehicle and said at least one device includes said driven unit which rotates said output member when the vehicle is coasting.

21. The apparatus of claim 1, wherein said prime mover is an engine of a motor vehicle and said at least one resilient element forms part of a freewheel which reduces the transmission of torque from said output member to said input member by way of said at least one resilient element when the vehicle is coasting.

22. The apparatus of claim 1 wherein said prime mover is an engine of a motor vehicle and said at least one resilient element engages a surface extending substantially radially of said axis and provided on one of said input and output members when the engine drives said input member so that said input member transmits torque to said output member and said torque increases to a predetermined value.

23. The apparatus of claim 1, further comprising a resiliently yieldable damper operating between said input and output members in series with said torque transmitting means.

24. The apparatus of claim 23, wherein said damper comprises at least one coil spring extending substantially circumferentially of said input and output members.

25. The apparatus of claim 23, wherein said damper comprises at least one coil spring extending substantially tangentially of an annular portion of at least one of said input and output members.

26. The apparatus of claim 23, wherein said at least one resilient element is located ahead of said damper as seen in the direction of transmission of torque from said prime mover to said driven unit.

27. The apparatus of claim 23, wherein said damper is arranged to damp torsional vibrations between said input and output members at least when said prime mover transmits torque to said driven unit by way of said torque transmitting means.

28. The apparatus of claim 1, wherein said prime mover includes an engine of a motor vehicle and said at least one resilient element is arranged to permit said output member to rotate relative to said input member at least when the vehicle is coasting and the magnitude of the torque being transmitted from said output member to said input member by way of said at least one resilient element reaches a predetermined value.

29. The apparatus of claim 1, wherein at least one of said input and output members comprises a substantially sleeve-like guide for said at least one resilient element and at least a portion of said annular internal surface is provided on said guide.

30. The apparatus of claim 29, wherein at least one of said input and output members comprises a substantially mandrel-shaped guide for said at least one resilient element.

31. The apparatus of claim 1, wherein said at least one resilient element is constructed and installed between said input and output members to yieldably oppose but to permit a predetermined angular displacement of said input and output members relative to each other.

32. The apparatus of claim 1, wherein said prime mover includes an engine of a motor vehicle and said at least one resilient element is arranged to transmit from said output member to said input member a torque in the range of between about 50 and 200 Nm when the vehicle is coasting.

33. The apparatus of claim 32, wherein said range is between about 80 and 150 Nm.

34. Apparatus for damping torsional vibrations, comprising an input member connectable with a rotary part of a prime mover and rotatable about a predetermined axis; an output member coaxial with and rotatable relative to said input member and connectable with a rotary part of a driven unit, and means for transmitting torque between and for opposing rotation of said input and output members relative to each other, comprising at least one elongated resilient element extending around said axis and being bendable at least radially of said axis and being normally stressed radially of said axis to thus establish a frictional engagement between said torque transmitting means and at least one of said input and output members, said at least one resilient element including a first portion in frictional engagement with said input member and a second portion in frictional engagement with said output member, the magnitude of torque being transmitted by said torque transmitting means between said input and output members being a function of frictional engagement between said first and second portions of said at least one resilient element and the respective members.

35. The apparatus of claim 34, wherein said at least one of said input and output members has a rotary surface in frictional engagement with said at least one resilient element.

36. The apparatus of claim 34, wherein said input and output members form part of a power train in a motor vehicle and the torque which said at least one resilient element transmits from said input member to said output member when the motor vehicle is pulling a load exceeds the torque which said at least one resilient element transmits from said output member to said input member while the motor vehicle is coasting.

37. Apparatus for damping torsional vibrations, comprising an input member including a first flywheel connectable with a rotary part of a prime mover and rotatable about a predetermined axis; an output member including a second flywheel coaxial with and rotatable relative to said input member and connectable by a friction clutch with a rotary part of a driven unit; and means for transmitting torque between and for opposing rotation of said input and output members relative to each other, comprising at least one elongated resilient element extending around said axis and being bendable at least radially of said axis and being normally stressed radially of said axis to thus establish a frictional engagement between said torque transmitting means and at least one of said input and output members.

38. The apparatus of claim 37, wherein said input and output members and said torque transmitting means form part of a composite flywheel.

* * * * *